US009626685B2

(12) United States Patent
Martinez et al.

(10) Patent No.: US 9,626,685 B2
(45) Date of Patent: Apr. 18, 2017

(54) SYSTEMS AND METHODS OF MAPPING ATTENTION

(75) Inventors: Ronald Martinez, San Francisco, CA (US); Marc Eliot Davis, San Francisco, CA (US); Christopher William Higgins, Portland, OR (US); Joseph James O'Sullivan, Oakland, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 921 days.

(21) Appl. No.: 11/969,751

(22) Filed: Jan. 4, 2008

(65) Prior Publication Data

US 2009/0177644 A1 Jul. 9, 2009

(51) Int. Cl.
*G06Q 30/02* (2012.01)

(52) U.S. Cl.
CPC .................................. *G06Q 30/02* (2013.01)

(58) Field of Classification Search
None
See application file for complete search history.

(56) References Cited

U.S. PATENT DOCUMENTS

| 5,446,891 A | 8/1995 | Kaplan et al. |
| 5,493,692 A | 2/1996 | Theimer et al. |
| 5,583,763 A | 12/1996 | Atcheson et al. |
| 5,651,068 A | 7/1997 | Klemba et al. |
| 5,761,662 A | 6/1998 | Dasan |
| 5,764,906 A | 6/1998 | Edelstein et al. |
| 5,781,879 A | 7/1998 | Arnold et al. |
| 5,784,365 A | 7/1998 | Ikeda |
| 5,794,210 A | 8/1998 | Goldhaber et al. |
| 5,802,510 A | 9/1998 | Jones |

(Continued)

FOREIGN PATENT DOCUMENTS

| EP | 1362302 | 11/2003 |
| JP | 2002312559 | 10/2002 |

(Continued)

OTHER PUBLICATIONS

Go With the Flow, The Economist Technology Quarterly, vol. 382, Issue 8519, pp. 18-19, (Mar. 10, 2007).

(Continued)

*Primary Examiner* — Hosain Alam
*Assistant Examiner* — Tuan-Khanh Phan
(74) *Attorney, Agent, or Firm* — James J. DeCarlo; Greenberg Traurig, LLP

(57) ABSTRACT

The disclosure describes systems and methods of ranking user interest in physical entities based on the attention given to those entities as determined by an analysis of communications from devices over multiple communication channels. The attention ranking systems allow any "Who, What, When, Where" entity to be defined and ranked based, at least in part, on information obtained from communications between users and user proxy devices. An entity rank is generated for entity known to the system in which the entity rank is derived from the information in communications that are indicative of user actions related to the entity. The entity ranks are then used to modify the display of information or data associated with the entities. The system may also generate a personal rank for each entity based on the relation of the entity to a specified user.

21 Claims, 12 Drawing Sheets

(56) References Cited

U.S. PATENT DOCUMENTS

| | | |
|---|---|---|
| 5,835,087 A | 11/1998 | Herz |
| 5,903,848 A | 5/1999 | Takahashi |
| 5,920,854 A | 7/1999 | Kirsch et al. |
| 6,014,638 A | 1/2000 | Burge et al. |
| 6,021,403 A | 2/2000 | Horvitz et al. |
| 6,047,234 A | 4/2000 | Cherveny et al. |
| 6,098,065 A | 8/2000 | Skillen et al. |
| 6,112,181 A | 8/2000 | Shear et al. |
| 6,157,924 A | 12/2000 | Austin |
| 6,169,992 B1 | 1/2001 | Beall et al. |
| 6,212,552 B1 | 4/2001 | Biliris et al. |
| 6,266,667 B1 | 7/2001 | Olsson |
| 6,314,365 B1 | 11/2001 | Smith |
| 6,314,399 B1 | 11/2001 | Deligne et al. |
| 6,324,519 B1 | 11/2001 | Eldering |
| 6,327,590 B1 | 12/2001 | Chidlovskii et al. |
| 6,446,065 B1 | 9/2002 | Nishioka et al. |
| 6,490,698 B1 | 12/2002 | Horvitz et al. |
| 6,502,033 B1 | 12/2002 | Phuyal |
| 6,523,172 B1 | 2/2003 | Martinez-Guerra et al. |
| 6,571,279 B1 | 5/2003 | Herz et al. |
| 6,601,012 B1 | 7/2003 | Horvitz et al. |
| 6,662,195 B1 | 12/2003 | Langseth et al. |
| 6,665,640 B1 | 12/2003 | Bennett et al. |
| 6,694,316 B1 | 2/2004 | Langseth et al. |
| 6,701,311 B2 | 3/2004 | Biebesheimer et al. |
| 6,701,315 B1 | 3/2004 | Austin |
| 6,708,203 B1 | 3/2004 | Makar et al. |
| 6,731,940 B1 | 5/2004 | Nagendran |
| 6,741,980 B1 | 5/2004 | Langseth et al. |
| 6,757,661 B1 | 6/2004 | Blaser et al. |
| 6,773,344 B1 | 8/2004 | Gabai et al. |
| 6,781,920 B2 | 8/2004 | Bates et al. |
| 6,785,670 B1 | 8/2004 | Chiang et al. |
| 6,789,073 B1 | 9/2004 | Lunenfeld |
| 6,813,501 B2 | 11/2004 | Kinnunen et al. |
| 6,816,850 B2 | 11/2004 | Culliss |
| 6,829,333 B1 | 12/2004 | Frazier |
| 6,834,195 B2 | 12/2004 | Brandenberg et al. |
| 6,842,761 B2 | 1/2005 | Diamond et al. |
| 6,845,370 B2 | 1/2005 | Burkey et al. |
| 6,850,252 B1 | 2/2005 | Hoffberg |
| 6,853,913 B2 | 2/2005 | Cherveny et al. |
| 6,853,982 B2 | 2/2005 | Smith et al. |
| 6,882,977 B1 | 4/2005 | Miller |
| 6,904,160 B2 | 6/2005 | Burgess |
| 6,931,254 B1 | 8/2005 | Egner et al. |
| 6,961,660 B2 | 11/2005 | Underbrink et al. |
| 6,961,731 B2 | 11/2005 | Holbrook |
| 6,985,839 B1 | 1/2006 | Motamedi et al. |
| 7,010,492 B1 | 3/2006 | Bassett et al. |
| 7,027,801 B1 | 4/2006 | Hall et al. |
| 7,058,508 B2 | 6/2006 | Combs et al. |
| 7,058,626 B1 | 6/2006 | Pan et al. |
| 7,062,510 B1 | 6/2006 | Eldering |
| 7,065,345 B2 | 6/2006 | Carlton et al. |
| 7,065,483 B2 | 6/2006 | Decary et al. |
| 7,069,308 B2 | 6/2006 | Abrams |
| 7,073,129 B1 | 7/2006 | Robarts et al. |
| 7,110,776 B2 | 9/2006 | Sambin |
| 1,593,668 A1 | 11/2006 | Mor Naaman |
| 7,143,091 B2 | 11/2006 | Charnock et al. |
| 7,149,696 B2 | 12/2006 | Shimizu et al. |
| 7,181,438 B1 | 2/2007 | Szabo |
| 7,185,286 B2 | 2/2007 | Zondervan |
| 7,194,512 B1 | 3/2007 | Creemer et al. |
| 7,203,597 B2 | 4/2007 | Sato et al. |
| 7,209,915 B1 | 4/2007 | Taboada et al. |
| 7,219,013 B1 | 5/2007 | Young et al. |
| 7,236,969 B1 | 6/2007 | Skillen et al. |
| 7,254,581 B2 | 8/2007 | Johnson et al. |
| 7,257,570 B2 | 8/2007 | Riise et al. |
| 7,305,445 B2 | 12/2007 | Singh et al. |
| 7,320,025 B1 | 1/2008 | Steinberg et al. |
| 7,343,364 B2 | 3/2008 | Bram et al. |
| 7,395,507 B2 | 7/2008 | Robarts et al. |
| 7,404,084 B2 | 7/2008 | Fransdonk |
| 7,437,312 B2 | 10/2008 | Bhatia et al. |
| 7,451,102 B2 | 11/2008 | Nowak |
| 7,461,168 B1 | 12/2008 | Wan |
| 7,496,548 B1 | 2/2009 | Ershov |
| 7,522,995 B2 | 4/2009 | Nortrup |
| 7,529,811 B2 | 5/2009 | Thompson |
| 7,562,122 B2 | 7/2009 | Oliver et al. |
| 7,577,665 B2 | 8/2009 | Rameer et al. |
| 7,584,215 B2 | 9/2009 | Saari et al. |
| 7,593,871 B1 * | 9/2009 | Mesaros .................. 705/26 |
| 7,624,104 B2 | 11/2009 | Berkhin et al. |
| 7,624,146 B1 | 11/2009 | Brogne et al. |
| 7,634,465 B2 | 12/2009 | Sareen et al. |
| 7,657,907 B2 | 2/2010 | Fennan et al. |
| 7,681,147 B2 | 3/2010 | Richardson-Bunbury et al. |
| 7,725,492 B2 | 5/2010 | Sittig et al. |
| 7,729,901 B2 | 6/2010 | Richardson-Bunbury et al. |
| 7,769,740 B2 | 8/2010 | Martinez |
| 7,769,745 B2 | 8/2010 | Naaman |
| 7,783,622 B1 | 8/2010 | Vandermolen et al. |
| 7,792,040 B2 | 9/2010 | Nair |
| 7,802,724 B1 | 9/2010 | Nohr |
| 7,822,871 B2 | 10/2010 | Stolorz et al. |
| 7,831,586 B2 | 11/2010 | Reitter et al. |
| 7,865,308 B2 | 1/2011 | Athsani |
| 7,925,708 B2 | 4/2011 | Davis |
| 2001/0013009 A1 | 8/2001 | Greening et al. |
| 2001/0035880 A1 | 11/2001 | Musatov et al. |
| 2001/0047384 A1 | 11/2001 | Croy |
| 2001/0052058 A1 | 12/2001 | Ohran |
| 2002/0014742 A1 | 2/2002 | Conte et al. |
| 2002/0019849 A1 | 2/2002 | Tuvey et al. |
| 2002/0019857 A1 | 2/2002 | Harjanto |
| 2002/0023091 A1 | 2/2002 | Silberberg et al. |
| 2002/0023230 A1 | 2/2002 | Bolnick et al. |
| 2002/0035605 A1 | 3/2002 | McDowell et al. |
| 2002/0049968 A1 | 4/2002 | Wilson et al. |
| 2002/0052786 A1 | 5/2002 | Kim et al. |
| 2002/0052875 A1 | 5/2002 | Smith et al. |
| 2002/0054089 A1 | 5/2002 | Nicholas |
| 2002/0065844 A1 | 5/2002 | Robinson et al. |
| 2002/0069218 A1 | 6/2002 | Sull et al. |
| 2002/0099695 A1 | 7/2002 | Abajian et al. |
| 2002/0103870 A1 | 8/2002 | Shouji |
| 2002/0111956 A1 | 8/2002 | Yeo et al. |
| 2002/0112035 A1 | 8/2002 | Carey |
| 2002/0133400 A1 | 9/2002 | Terry et al. |
| 2002/0138331 A1 | 9/2002 | Hosea et al. |
| 2002/0152267 A1 | 10/2002 | Lennon |
| 2002/0169840 A1 | 11/2002 | Sheldon et al. |
| 2002/0173971 A1 | 11/2002 | Stirpe et al. |
| 2002/0178161 A1 | 11/2002 | Brezin et al. |
| 2002/0198786 A1 | 12/2002 | Tripp et al. |
| 2003/0008661 A1 | 1/2003 | Joyce et al. |
| 2003/0009367 A1 | 1/2003 | Morrison |
| 2003/0009495 A1 | 1/2003 | Adjaoute |
| 2003/0027558 A1 | 2/2003 | Eisinger |
| 2003/0032409 A1 | 2/2003 | Hutcheson et al. |
| 2003/0033331 A1 | 2/2003 | Sena et al. |
| 2003/0033394 A1 | 2/2003 | Stine et al. |
| 2003/0065762 A1 | 4/2003 | Stolorz et al. |
| 2003/0069877 A1 | 4/2003 | Grefenstette et al. |
| 2003/0069880 A1 | 4/2003 | Harrison et al. |
| 2003/0078978 A1 | 4/2003 | Lardin et al. |
| 2003/0080992 A1 | 5/2003 | Haines |
| 2003/0126250 A1 | 7/2003 | Jhanji |
| 2003/0149574 A1 | 8/2003 | Rudman |
| 2003/0154293 A1 | 8/2003 | Zmolek |
| 2003/0165241 A1 | 9/2003 | Fransdonk |
| 2003/0191816 A1 | 10/2003 | Landress et al. |
| 2004/0010492 A1 | 1/2004 | Zhao et al. |
| 2004/0015588 A1 | 1/2004 | Cotte |
| 2004/0030798 A1 | 2/2004 | Andersson et al. |
| 2004/0034752 A1 | 2/2004 | Ohran |
| 2004/0043758 A1 | 3/2004 | Sorvari et al. |
| 2004/0044736 A1 | 3/2004 | Austin-Lane et al. |
| 2004/0070602 A1 | 4/2004 | Kobuya et al. |

(56) References Cited

U.S. PATENT DOCUMENTS

| | | |
|---|---|---|
| 2004/0139025 A1 | 7/2004 | Coleman |
| 2004/0139047 A1 | 7/2004 | Rechsteiner |
| 2004/0148341 A1 | 7/2004 | Cotte |
| 2004/0152477 A1 | 8/2004 | Wu et al. |
| 2004/0183829 A1 | 9/2004 | Kontny et al. |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan et al. |
| 2005/0149397 A1 | 7/2005 | Morgenstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angles et al. |
| 2006/0123053 A1 | 6/2006 | Scannell, Jr. |
| 2006/0129313 A1 | 6/2006 | Becker |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Amerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0258368 A1 | 11/2006 | Granito et al. |
| 2006/0282455 A1 | 12/2006 | Lee |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100724 A1* | 5/2007 | Hollas et al. ............... 705/36 R |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1* | 6/2007 | Jones et al. ................. 707/104.1 |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1 | 12/2007 | Varghese |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114751 A1 | 5/2008 | Cramer et al. |
| 2008/0120183 A1 | 5/2008 | Park |
| 2008/0120308 A1 | 5/2008 | Martinez et al. |
| 2008/0120690 A1 | 5/2008 | Norlander et al. |
| 2008/0133750 A1 | 6/2008 | Grabarnik et al. |
| 2008/0147655 A1 | 6/2008 | Sinha et al. |

(56) References Cited

U.S. PATENT DOCUMENTS

| | | | |
|---|---|---|---|
| 2008/0147743 | A1 | 6/2008 | Taylor et al. |
| 2008/0148175 | A1 | 6/2008 | Naaman et al. |
| 2008/0154720 | A1 | 6/2008 | Gounares |
| 2008/0163284 | A1 | 7/2008 | Martinez et al. |
| 2008/0172632 | A1 | 7/2008 | Stambaugh |
| 2008/0177706 | A1 | 7/2008 | Yuen |
| 2008/0270579 | A1 | 10/2008 | Herz et al. |
| 2008/0285886 | A1 | 11/2008 | Allen |
| 2008/0301250 | A1 | 12/2008 | Hardy et al. |
| 2008/0306908 | A1* | 12/2008 | Agrawal et al. ............ 707/3 |
| 2008/0320001 | A1 | 12/2008 | Gaddam |
| 2009/0005987 | A1 | 1/2009 | Vengroff et al. |
| 2009/0006336 | A1 | 1/2009 | Forstall et al. |
| 2009/0012934 | A1 | 1/2009 | Yerigan |
| 2009/0012965 | A1 | 1/2009 | Franken |
| 2009/0043844 | A1 | 2/2009 | Zimmet et al. |
| 2009/0044132 | A1 | 2/2009 | Combel et al. |
| 2009/0063254 | A1 | 3/2009 | Paul et al. |
| 2009/0070186 | A1 | 3/2009 | Buiten et al. |
| 2009/0073191 | A1 | 3/2009 | Smith et al. |
| 2009/0076889 | A1 | 3/2009 | Jhanji |
| 2009/0100052 | A1 | 4/2009 | Stern et al. |
| 2009/0106356 | A1 | 4/2009 | Brase et al. |
| 2009/0125517 | A1 | 5/2009 | Krishnaswamy et al. |
| 2009/0132941 | A1 | 5/2009 | Pilskalns et al. |
| 2009/0144141 | A1 | 6/2009 | Dominowska et al. |
| 2009/0150501 | A1 | 6/2009 | Davis et al. |
| 2009/0150507 | A1 | 6/2009 | Davis et al. |
| 2009/0165051 | A1 | 6/2009 | Armaly |
| 2009/0171939 | A1 | 7/2009 | Athsani et al. |
| 2009/0177603 | A1 | 7/2009 | Honisch |
| 2009/0187637 | A1 | 7/2009 | Wu et al. |
| 2009/0204484 | A1 | 8/2009 | Johnson |
| 2009/0204672 | A1 | 8/2009 | Jetha et al. |
| 2009/0204676 | A1 | 8/2009 | Parkinson et al. |
| 2009/0216606 | A1 | 8/2009 | Coffman et al. |
| 2009/0222302 | A1 | 9/2009 | Higgins |
| 2009/0222303 | A1 | 9/2009 | Higgins |
| 2009/0234814 | A1 | 9/2009 | Boerries et al. |
| 2009/0234909 | A1 | 9/2009 | Strandeil et al. |
| 2009/0249482 | A1 | 10/2009 | Sarathy |
| 2009/0265431 | A1 | 10/2009 | Janie et al. |
| 2009/0281997 | A1 | 11/2009 | Jain |
| 2009/0299837 | A1 | 12/2009 | Steelberg et al. |
| 2009/0313546 | A1 | 12/2009 | Katpelly et al. |
| 2009/0320047 | A1 | 12/2009 | Khan et al. |
| 2009/0323519 | A1 | 12/2009 | Pun |
| 2009/0328087 | A1 | 12/2009 | Higgins et al. |
| 2010/0002635 | A1 | 1/2010 | Eklund |
| 2010/0014444 | A1 | 1/2010 | Ghanadan et al. |
| 2010/0063993 | A1 | 3/2010 | Higgins et al. |
| 2010/0070368 | A1 | 3/2010 | Choi et al. |
| 2010/0118025 | A1 | 5/2010 | Smith et al. |
| 2010/0125563 | A1 | 5/2010 | Nair et al. |
| 2010/0125569 | A1 | 5/2010 | Nair et al. |
| 2010/0125604 | A1 | 5/2010 | Martinez et al. |
| 2010/0125605 | A1 | 5/2010 | Nair et al. |
| 2010/0185642 | A1 | 7/2010 | Higgins et al. |

FOREIGN PATENT DOCUMENTS

| | | |
|---|---|---|
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

U.S. Appl. No. 11/593,668, filed Nov. 6, 2006 for Naaman, et al.
U.S. Appl. No. 11/593,869, filed Nov. 6, 2006 for Naaman, et al.
"Gutenkarte" Book Catalog, 2006 MetaCarta, Inc., www.gutenkarte.org 11pgs.
Baron, N.S. et al. (Aug. 30, 2005). "Tethered or Mobile? Use of Away Messages in Instant Messaging by American College Students," Chapter 20.1 in Mobile Communication, Springer: London, England, 31:293-297.
Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/ >, last visited on Feb. 2, 2010, thirteen pages.
Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h > . . . , last visited on Feb. 2, 2010, ten pages.
Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p . . . ,> last visited on Feb. 2, 2010, seventeen pages.
Wooldridge, M. et al. (2005). "STALK. The Camera-phone Scavenger Hunt!" located at <http://www.stalk.com >, last visited on Dec. 28, 2009, two pages.
www.stalk.com (retrieved on Dec. 29, 2009) pp. 1-2.
Anonymous. (Date Unknown). "CommunityWalk—About," located at <http://www.communitywalk.com/about >, last visited on Mar. 3, 2008, one page.
Anonymous. (Date Unknown). "CommunityWalk Mapping Made Easy," located at <http://www.communitywalk.com/>, last visited on Mar. 3, 2008, one page.
Anonymous. (Date Unknown). "Google Earth User Guide" located at <http://earth.google.com/userguide/v4/>, last visited on Feb. 27, 2008, twelve pages.
Anonymous. (Date Unknown). "Google Earth—Wikipedia, the Free Encyclopedia," located at <http://en.wikipedia.org/wiki/Google_earth >, last visited on Mar. 3, 2008, fourteen pages.
Anonymous. (Date Unknown). "Google Earth User Guide—Using Image Overlays and 3D Models," located at <http://earth.google.com/userguide/v4/ug_imageoverlays.html >, nine pages.
Anonymous. (Date Unknown). "Google Maps," located at <http://en.wikipedia.org/wiki/Google_maps >, last visited on Feb. 27, 2008, eleven pages.
Anonymous. (Date Unknown). "Live Search Maps," located at <http://en.wikipedia.org/wiki/Windows_live_maps >, last visited on Mar. 3, 2008, six pages.
Anonymous. (Date Unknown). "WikiMapia," located at <http://en.wikipedia.org/wiki/WikiMapia >, last visited on Mar. 3, 2008, three pages.
Anonymous. (2007). "Ask.com Maps & Directions," located at <http://maps.ask.com/maps >, last visited on Mar. 3, 2008, one page.
Anonymous. (2007). "Wayfaring Follow You, Follow Me," located at <http://www.wayfaring.com/>, last visited on Mar. 3, 2008, three pages.
Anonymous. (2008). "Platial the People's Atlas," located at <www.platial.com >, last visited on Mar. 3, 2008, one page.
Anonymous. (2008). "Wikimpaia.org ," located at <http://wikimpaia.org/>, last visited on Mar. 3, 2008, one page.
U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, filed Jul. 25, 2008, Higgins.
U.S. Appl. No. 12/180,499, filed Jul. 25, 2008, Higgins.
U.S. Appl. No. 12/015,146, filed Jan. 16, 2008, Higgins.

(56) References Cited

OTHER PUBLICATIONS

U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054, file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S. Appl. No. 12/041,054 dated Oct. 27, 2010; 15 pages.
Office Action U.S. Appl. No. 12/041,062 dated Oct. 28, 2010; 12 pages.
International Search Report PCT/US2009/034444 dated Sep. 18, 2009; 2 pages.
Office Action U.S. Appl. No. 12/041,088 dated Oct. 4, 2010; 18 pages.
Axup, Jeff et al., "Conceptualizing New Mobile Devices by Observing Gossip and Social Network Formation Amongst the Extremely Mobile", ITEE Technical Report #459, Dec. 19, 2005, pp. 1-71.
Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).
Davis, Marc et al., "From Context to Content: Leveraging Context to Infer Media Metadata", ACM Press, Oct. 10, 2004, pp. 1-8.
Kaasinen, E., "Behaviour & Information Technology", Taylor & Francis, vol. 24, No. 1, Jan./Feb. 2005, pp. 37-49, (Abstract only attached).
Konomi, Shin'ichi et al., "Supporting Colocated Interactions Using RFID and Social Network Displays", Pervasive Computing, Jul.-Sep. 2006, vol. 5, No. 3, pp. 48-56 (pp. 1-4 of attached).
Lin, F. et al., "A unified framework for managing Web-based services.", Information Systems and e-Business Management, vol. 3, Oct. 2005, p. 299, (pp. 1-15 of attached).
Metz, Cade, "MySpace Nation", PC Magazine, Jun. 21, 2006, pp. 1-10 attached.
Perkowitz, Mike et al., "Utilizing Online Communities to Facilitate Physical World Interactions", The International Conference on Communities and Technologies, Sep. 19, 2003, Amsterdam, pp. 1 6.
Roush, Wade, "Social Machines", Continuous Computing Blog, Jul. 5, 2005, pp. 1-21.
Roush, Wade, "Social Machines", Technology Review, Aug. 2005, pp. 45-51.
Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).
Voight, Joan et al., "Lessons for Today's Digital Market", ADWEEKCOM, Oct. 2, 2006, pp. 1-6.
"Companies add new communication features to photo sharing.", Digital Imaging Digest, Feb. 2006, pp. 1-2.
"Dave.TV and Eye Music Network Empower Users to Create Their Own Music TV Channel on Their Sites With New IPTV Channel", www.davenw.com/2006, Sep. 13, 2006, pp. 1-2.

"Digital rights management: a primer: developing a user-friendly means of protecting content.(Profile)", Screen Digest, No. 420, p. 305, Sep. 2006, (pp. 1-9 of attached).
"Emerging Markets: What media 2.0 can offer advertisers.", Campaign, Oct. 27, 2006, p. 26, (pp. 1-5 of attached).
"Reality Digital Debuts Opus", www.lightreading.com. Sep. 25, 2006, pp. 1.
"Reality Digital—Making Media Move", www.realitydigital.com, Nov. 28, 2006, pp. 1-2.
Nedos, A; Singh K., Clarke S, Proximity Based Group Communications for Mobile Ad Hoc Networks'; Proximity-Based Group Communication; Global Smart Spaces; D.14; Oct. 3, 2003; 31 pages.
Brunato, M; Battiti R. "PILGRIM: A Location Broker and Mobility-Aware Recommendation System"; Technical report DIT-02-0092, Universita di Trento, Oct. 2002; 8 pages.
Backstrom et al., Spatial Variation in Search Engine Queries, WWW•2008, Beijing, China (Apr. 21-25, 2008).
Gan et al., Analysis of Geographic Queries in a Search Engine Log, LocWeb 2008, Beijing, China (Apr. 22, 2008).
Jones et al., Geographic Intention and Modification in Web Search, International Journal of Geographical Information Science, vol. 22, No. 3, pp. 1-20 (Jul. 2008).
Sanderson et al., Analyzing Geographic Queries; Department of Information Studies; University of Sheffield, UK; 2 pages.
Go With the Flow, The Economist Technology Quarterly, vol. 382, Issue 8519, 4 pages, (Mar. 10, 2007).
International Search Report and Written Opinion (PCT/US2009/060476) dated May 4, 2010; 12 pages.
International Search Report and Written Opinion (PCT/US2009/060374) dated Apr. 30, 2010; 12 pages.
International Search Report (PCT/US2009/060379) dated Apr. 30, 2010; 3 pages.
International Search Report and Written Opinion (PCT/US2008/085135) dated May 25, 2009; 7 pages.
International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.
International Search Report and Written Opinion (PCT/US2009/046258) dated Dec. 23, 2009; 7 pages.
U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.
U.S. Appl. No. 11/593,869, filed Nov. 6, 2006, Mor Naaman.
Allen James F., "Maintaining Knowledge About Temporal Intervals", Communications of the ACM, Nov. 1983, vol. 26, No. 11 pp. 832-843; 12 pages.
Press Release, "QUALCOMM Conducts First Live Demonstration of FL Technology on a Wireless Handset", Qualcomm Inc., San Diego, Sep. 27, 2005; 3 pages.
MediaFlo, FLO Technology Overview, Qualcomm Inc. Copyright 2007; 24 pages.
Notification of Transmittal of the International Search Report and the Written Opinion of the International Search Authority, or Declaration (PCT/US2007/'084797) dated Mar. 21, 2008; 11 pages.
International Search Report (PCT/US2007/084807) dated May 27, 2008; 3 pages.
International Preliminary Report on Patentability (PCT/US2007/084807) dated May 26, 2009; 5 pages.
International Search Report (PCT/US2010/026063) dated May 27, 2008; 3 pages.

(56) References Cited

OTHER PUBLICATIONS

Rekimoto, et al., "CyberCode: designing augmented reality environments with visual tags." Proceedings of DARE 2000 on Designing augmented reality environments, Elsinore, Denmark, pp. 1-11 Apr. 12-14, 2000.
"Semacode-URL Barcodes—practical ubiquitous computing", located at http://semacode.org visited on Apr. 13, 2007; 3 pages.
"Technical White Paper: Choosing the best 2D barcode format for mobile apps," Semacode, Jul. 15, 2006; pp. 1-7 located at http://semacode.org/about/technical/whitepaper/best2_d_code.pdf.
Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.
Cooper, M. et al. (Nov. 2-8, 2003). "Temporal Event Clustering for Digital Photo Collections," MM'03 Berkeley, California, pp. 364-373.
Davis, M. et al. (Oct. 10-16, 2004). "From Context to Content: Leveraging Context to Infer Media Metadata," MM'04 New York, New York. 9 pages.
Davis, M. et al. "From Context to Content: Leveraging Context for Mobile Media Metadata." 9 pages.
Davis. M. et al. (Apr. 2-7, 2005). "MMM2: Mobile Media Metadata for Media Sharing," CHI 2005 Portland, Oregon. 4 pages.
Davis, M. et al. "Mobile Media Metadata for Mobile Imaging." Jun. 27-30, 2004; 4 pages.
Davis, M. et al. "Using Context and Similarity for Face and Location Identification." 10 pages.
Flickr. Welcome to Flickr—Photo Sharing, located at <http://www.flickr.com > visited on Feb. 26, 2007, one page.
Gargi, U. (Aug. 7, 2003). "Consumer Media Capture: Time-Based Analysis and Event Clustering," Technical Report HPL-2003-165 HP Laboratories Palo Alto, pp. 1-15.
Goldberger, J. et al. 'The Hungarian Clustering Method, located at <http://scholar.googles.com/scholar?num=20&h1=en&lr=&9=cache:vbwslsm1CisJ:www.openu .acil/Personal_sites/tarnirtassa/Publications/hcm.
pdf+goldberger+clustering+method+hungarian> visited on Mar. 1, 2007, twelve pages.
Graham, A. et al. (Jul. 13-17, 2002). Time as Essence for Photo Browsing Through Personal Digital Libraries, JCDL '02 Portland, Oregon. 11 pages.
Jaffe, A. et al. (May 23-26, 2006). "Generating Summaries for Large Collections of Geo-Referenced Photographs," WWW 2006 Edinburgh, Scotland. 2 pages.
Jaffe, A. et al. (Oct. 26-27, 2006). "Generating Summaries and Visualization for Large Collections of Geo-Referenced Photographs," MIR '06 Santa Barbara, California. 11 pages.
Joshi, D. et al. (Oct. 15-16, 2004). "The Story Picturing Engine: Finding Elite Images to Illustrate a Story Using Miitual Reinforcement," MIR '04 New York, New York. 9 pages.
Naaman, M. et al. (Nov. 2003). "From Where to What: Metadata Sharing for Digital Photographs with Geographic Coordinates," In on the Move to Meaningful Internet Systems 2003: Coop/S, DOA, and ODBASE R. Meersman et al. eds., pp. 196-217.
Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.
Nair, R. et al. (Nov. 6-11, 2005). "Photo L01: Browsing Multi-User Photo Collections," MM'05 Singapore, pp. 223-224.
0' Hare, N. et al. "Combination of Content Analysis and Context Features for Digital Photograph Retrieval." 7 pages.
Pigeau, A. et al. (Jun. 17, 2005). "Organizing a Personal Image Collection with Statistical Model-Based ICL Clustering on Spatio-Temporal Camera Phone Meta-Data." 25 pages.
Sarvas, R. et al. (Jun. 6-9, 2004). "Metadata Creation System for Mobile Images," MobiSys'04 Boiton, Massachusetts, pp. 36-48.
Toyama, K. et al. (Nov. 2-8, 2003). "Geographic Location Tags on Digital Images," MM '03'Berkeley: California. 12 pages.
Almieda, R.B. et al. "A Community-Aware Search Engine," WWW2004, New York., NY, May 17-22, 2004, pp. 413-421.
Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.
Anonymous. (Jul. 17, 2006). "Fantasy Football Lineup Analyzer—Tips for Who to Start & Who to Bench each Week," located at http://web.archive.org/web/200607171633529/www.
fantasyfootballstarters.com/lineupAnalyzer.jsp>, last visited on Feb. 10, 2009, one page.
Bharat, K. (Date Unknown). "SearchPad: Explicit Capture of Search Context to Support Web Search," located at <http://www9.org/w9cdrom/173/173.html >, last visited Aug. 1, 2007, 13 pages.
Budzik, J. et al. (2000). "User Interactions with Everyday Applications as Context for Just-in-Time Information Access," Proceeding of the 2000 Conference on Intelligent User Interfaces, eight pages.
Finkelstein, L. et al. (2001). "Placing Search in Context: The Concept Revisited," WWW/O, Hong Kong, May 2-5, 2001, pp. 406-414.
Freyne, J. et al. (2004). "Further Experiments on Collaborative Ranking in Community-Based Web Search," Artificial Intelligence Review, pp. 1-23.
Lieberman, H. (1995) "Letizia: An Agent that Assists Web Browsing," Proceedings of the Fourteenth International Joint Conference on Artificial Intelligence, Aug. 20-25, 1995, six pages.
Mitra, M. et al. (1998). "Improving Automatic Query Expansion," Proceedings of the AMC SIGIR, nine pages.
Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent . . . >, last visited Aug. 1, 2007, six pages.
Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.
Yahoo! Inc. (Dec. 7, 2005). "Yahoo! Widget Engine 3.0 Reference Manual Version 3.0," 300 pages.
U.S. Appl. No. 12/407,690, filed Mar. 19, 2009; 50 pages.
U.S. Appl. No. 12/407,681, filed Mar. 19, 2009; 56 pages.
International Search Report PCT/US2008/088228 dated Sep. 30, 2009—2 pages.
Written Opinion PCT/US2008/088228 dated Sep. 30, 2009—5 pages.
U.S. Appl. No. 12/273,259, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/952,007, filed Dec. 6, 2007, Davis.
U.S. Appl. No. 11/953,454, filed Dec. 10, 2007, Davis.
U.S. Appl. No. 11/953,494, filed Dec. 10, 2007, Davis.
U.S. Appl. No. 12/059,594, filed Mar. 31, 2008, Martinez.
U.S. Appl. No. 12/236,668, filed Sep. 24, 2008, Davis.
U.S. Appl. No. 12/057,943, filed Mar. 28, 2008, Martinez.
U.S. Appl. No. 12/057,878, filed Mar. 28, 2008, Martinez.
U.S. Appl. No. 12/145,145, filed Jun. 24, 2008, Davis.
U.S. Appl. No. 12/163,249, filed Jun. 27, 2008, Kalaboukis.
U.S. Appl. No. 12/182,969, filed Jul. 30, 2008, Higgins.
U.S. Appl. No. 12/182,813, filed Jul. 30, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241,590, filed Sep. 30, 2008, Athsani.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.

(56) References Cited

OTHER PUBLICATIONS

U.S. Appl. No. 12/273,317, filed Nov. 18, 2008, Nair.
U.S. Appl. No. 12/273,345, filed Nov. 18, 2008, Nair.
U.S. Appl. No. 12/273,371, filed Nov. 18, 2008, Nair.
U.S. Appl. No. 12/241,198, filed Sep. 30, 2008, Higgins.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.

\* cited by examiner

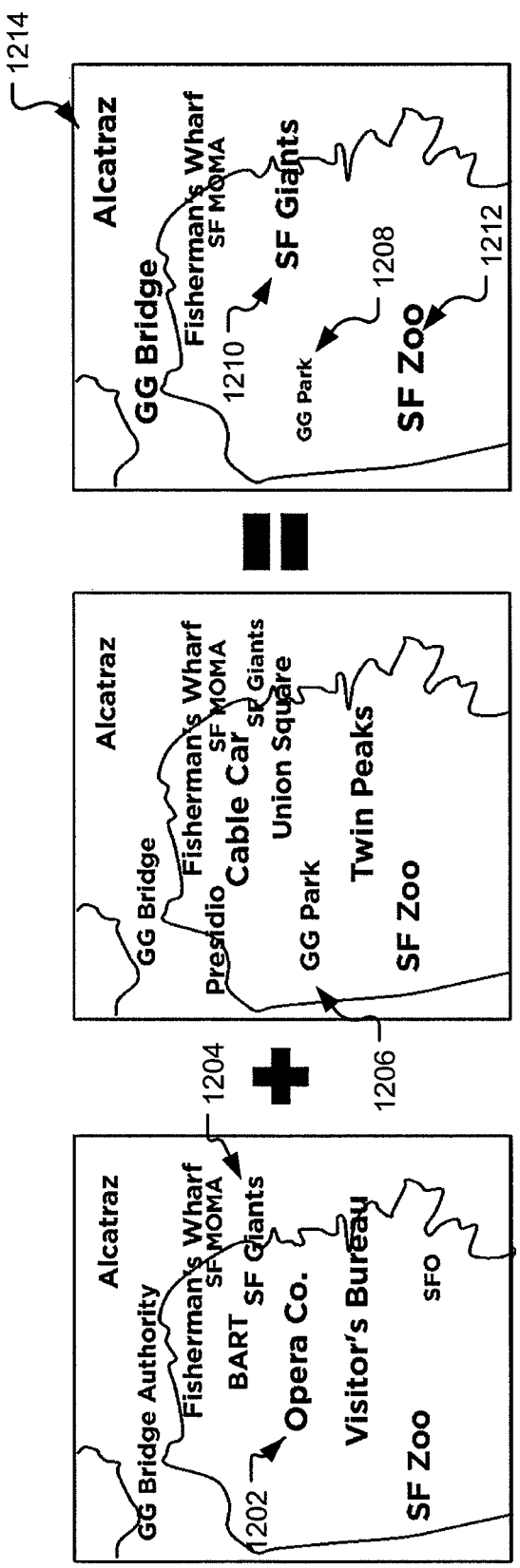

SYSTEMS AND METHODS OF MAPPING ATTENTION

BACKGROUND

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information may be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network are also not captured effectively. There exists a need for methods, systems and apparatus to collect and communicate data associated with users and their electronic devices.

SUMMARY

The disclosure describes systems and methods for using data collected and stored by multiple devices on a network in order to improve the performance of the services provided via the network. In this disclosure, systems and methods of ranking user interest in physical entities are described. The systems and methods are based on the attention given to entities as determined by an analysis of communications from devices over multiple communication channels. The attention ranking systems allow any "Who, What, When, Where" entity to be defined and ranked based, at least in part, on information obtained from communications between users and user proxy devices. An entity rank is generated for each entity known to the system in which the entity rank is derived from the amount and/or type of information in communications that are indicative of user actions related to the entity. The entity ranks may then be used to modify the display of information or data associated with the entities. The system may also generate a personal rank for each entity based on the relation of the entity to a specified user.

One aspect of the disclosure is a method comprising receiving a request to display information related to a physical entity; transforming the request into search data; applying the search data to a set of predefined physical entities known to a network to derive a subset of physical entities matching the search data; ranking the physical entities in the subset of physical entities to form a ranked subset of physical entities; and presenting information related to the ranked subset of physical entities to a first user, the presenting of the ranked physical entities information being dependent upon user information stored in the network, the user information comprising data generated by the user, data associated with the user, and data associated with the request.

Another aspect of the disclosure is a system comprising a physical entity request engine comprising a request sub-module that receives one or more requests to display information related to a physical entity; a transform sub-module that transforms the request into search data; a subset generation and matching sub-module that applies the search data to a set of predefined physical entities known to a network to derive a subset of physical entities matching the search data; and an attention rank engine for ranking the subset of physical entities to form a ranked subset of physical entities after having generated entity rank, attention rank, and personal rank; and a mapping manager module for presenting information related to the ranked subset of physical entities to a first user, the presenting of the ranked physical entities information being dependent upon user information stored in the network, the user information comprising data generated by the user, data associated with the user, and data associated with the request.

Yet another aspect of the disclosure is a computer-readable medium comprising computer-readable instructions tangibly stored thereon, the instructions when executed by a computer carrying out a method of ranking physical entities, the method comprising receiving a request to display information related to a physical entity; transforming the request into search data; applying the search data to a set of predefined physical entities known to a network to derive a subset of physical entities matching the search data; ranking the physical entities in the subset of physical entities to form a ranked subset of physical entities; and presenting information related to the ranked subset of physical entities to a first user, the presenting of the ranked physical entities information being dependent upon user information stored in the network, the user information comprising data generated by the user, data associated with the user, and data associated with the request.

Another aspect of the disclosure is a visibly depicted graphical user interface comprising a visible representation of a geographic region; the visible representation further comprising visible indicators; the visible indicators comprising a variable characteristic; and the variable characteristic depending upon the attention rank of the physical entities that the visible indicators represent.

These and various other features as well as advantages will be apparent from a reading of the following detailed description and a review of the associated drawings. Additional features are set forth in the description that follows and, in part, will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the disclosure in any manner, which scope shall be based on the claims appended hereto.

FIG. 12 illustrates an embodiment of a graphical user interface for displaying information related to physical entities.

DETAILED DESCRIPTION

Figure 1:
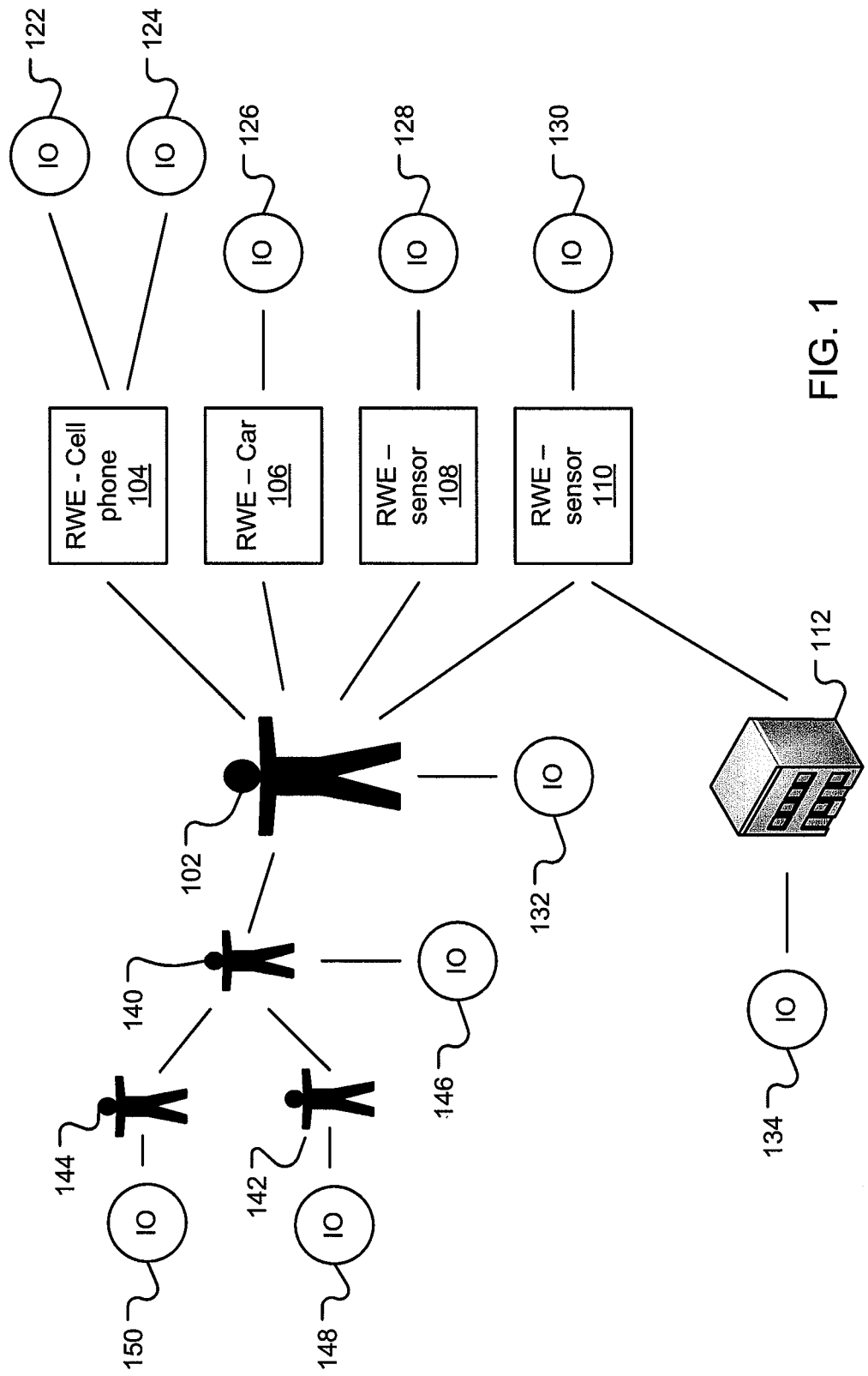
FIG. 1 illustrates an example of the relationships between RWEs and IOs on the W4 COMN.

This disclosure describes a communication network, referred to herein as the "W4 Communications Network" or W4 COMN, that uses information related to the "Who, What, When and Where" of interactions with the network to provide improved services to the network's users. The W4 COMN is a collection of users, devices and processes that foster both synchronous and asynchronous communications between users and their proxies. It includes an instrumented network of sensors providing data recognition and collection in real-world environments about any subject, location, user or combination thereof.

As a communication network, the W4 COMN handles the routing/addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

The W4 COMN uses a data modeling strategy for creating profiles for not only users and locations but also any device on the network and any kind of user-defined data with user-specified conditions from a rich set of possibilities. Using Social, Spatial, Temporal and Logical data available about a specific user, topic or logical data object, every entity known to the W4 COMN can be mapped and represented against all other known entities and data objects in order to create both a micro graph for every entity as well as a global graph that interrelates all known entities against each other and their attributed relations.

In order to describe the operation of the W4 COMN, two elements upon which the W4 COMN is built must first be introduced, real-world entities and information objects. These distinctions are made in order to enable correlations to be made from which relationships between electronic/logical objects and real objects can be determined. A real-world entity (RWE) refers to a person, device, location, or other physical thing known to the W4 COMN. Each RWE known to the W4 COMN is assigned or otherwise provided with a unique W4 identification number that absolutely identifies the RWE within the W4 COMN.

RWEs may interact with the network directly or through proxies, which may themselves be RWEs. Examples of RWEs that interact directly with the W4 COMN include any device such as a sensor, motor, or other piece of hardware that connects to the W4 COMN in order to receive or transmit data or control signals. Because the W4 COMN can be adapted to use any and all types of data communication, the devices that may be RWEs include all devices that can serve as network nodes or generate, request and/or consume data in a networked environment or that can be controlled via the network. Such devices include any kind of "dumb" device purpose-designed to interact with a network (e.g., cell phones, cable television set top boxes, fax machines, telephones, and radio frequency identification (RFID) tags, sensors, etc.). Typically, such devices are primarily hardware and their operations can not be considered separately from the physical device.

Examples of RWEs that must use proxies to interact with the W4 COMN network include all non-electronic entities including physical entities, such as people, locations (e.g., states, cities, houses, buildings, airports, roads, etc.) and things (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) are also considered RWEs that must use proxies to interact with the network. Smart devices are electronic devices that can execute software via an internal processor in order to interact with a network. For smart devices, it is actually the executing software application(s) that interact with the W4 COMN and serve as the devices' proxies.

The W4 COMN allows associations between RWEs to be determined and tracked. For example, a given user (an RWE) may be associated with any number and type of other RWEs including other people, cell phones, smart credit cards, personal data assistants, email and other communication service accounts, networked computers, smart appliances, set top boxes and receivers for cable television and other media services, and any other networked device. This association may be made explicitly by the user, such as when the RWE is installed into the W4 COMN. An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association may include the user identifying a specific relationship between the user and the RWE (e.g., this is my device, this is my home appliance, this person is my friend/father/son/etc., this device is shared between me and other users, etc.). RWEs may also be implicitly associated with a user based on a current situation. For example, a weather sensor on the W4 COMN may be implicitly associated with a user based on information indicating that the user lives or is passing near the sensor's location.

An information object (10), on the other hand, is a logical object that stores, maintains, generates, serves as a source for or otherwise provides data for use by RWEs and/or the W4 COMN. IOs are distinct from RWEs in that IOs represent data, whereas RWEs may create or consume data (often by creating or consuming IOs) during their interaction with the W4 COMN. Examples of IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that may further be associated with a known topic/activity/significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In addition, IOs include any executing process or application that consumes or generates data such as an email communication application (such as OUTLOOK by MICROSOFT, or YAHOO! MAIL by YAHOO!), a calendaring application, a word processing application, an image editing application, a media player application, a weather monitoring application, a browser application and a web page server application. Such active IOs may or may not serve as a proxy for one or more RWEs. For example, voice communication software on a smart phone may serve as the proxy for both the smart phone and for the owner of the smart phone.

An IO in the W4 COMN may be provided a unique W4 identification number that absolutely identifies the IO within the W4 COMN. Although data in an IO may be revised by the act of an RWE, the IO remains a passive, logical data representation or data source and, thus, is not an RWE.

For every IO there are at least three classes of associated RWEs. The first is the RWE who owns or controls the IO, whether as the creator or a rights holder (e.g., an RWE with editing rights or use rights to the IO). The second is the RWE(s) that the IO relates to, for example by containing information about the RWE or that identifies the RWE. The third are any RWEs who then pay any attention (directly or through a proxy process) to the IO, in which "paying attention" refers to accessing the IO in order to obtain data from the IO for some purpose.

"Available data" and "W4 data" means data that exists in an IO in some form somewhere or data that can be collected as needed from a known IO or RWE such as a deployed sensor. "Sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates an example of the relationships between RWEs and IOs on the W4 COMN. In the embodiment illustrated, a user 102 is a RWE of the network provided with a unique network ID. The user 102 is a human that communicates with the network via the proxy devices 104, 106, 108, 110 associated with the user 102, all of which are RWEs of the network and provided with their own unique network ID. Some of these proxies may communicate directly with the W4 COMN or may communicate with the W4 COMN via IOs such as applications executed on or by the device.

As mentioned above the proxy devices 104, 106, 108, 110 may be explicitly associated with the user 102. For example, one device 104 may be a smart phone connected by a cellular service provider to the network and another device 106 may be a smart vehicle that is connected to the network. Other devices may be implicitly associated with the user 102. For example, one device 108 may be a "dumb" weather sensor at a location matching the current location of the user's cell phone 104, and thus implicitly associated with the user 102 while the two RWEs 104, 108 are co-located.

Another implicitly associated device 110 may be a sensor 110 for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor 110 at that location 112), to be associated with the first user 102.

The user 102 may also be directly associated with other people, such as the person 140 shown, and then indirectly associated with other people 142, 144 through their associations as shown. Again, such associations may be explicit (e.g., the user 102 may have identified the associated person 140 as his/her father, or may have identified the person 140 as a member of the user's social network) or implicit (e.g., they share the same address).

Tracking the associations between people (and other RWEs as well) allows the creation of the concept of "intimacy": Intimacy being a measure of the degree of association between two people or RWEs. For example, each degree of removal between RWEs may be considered a lower level of intimacy, and assigned lower intimacy score. Intimacy may be based solely on explicit social data or may be expanded to include all W4 data including spatial data and temporal data.

Each RWE 102, 104, 106, 108, 110, 112, 140, 142, 144 of the W4 COMN may be associated with one or more IOs as shown. Continuing the examples discussed above, FIG. 1 illustrates two IOs 122, 124 as associated with the cell phone device 104. One IO 122 may be a passive data object such as an event record that is used by scheduling/calendaring software on the cell phone, a contact IO used by an address book application, a historical record of a transaction made using the device 104 or a copy of a message sent from the device 104. The other IO 124 may be an active software process or application that serves as the device's proxy to the W4 COMN by transmitting or receiving data via the W4 COMN. Voice communication software, scheduling/calendaring software, an address book application or a text messaging application are all examples of IOs that may communicate with other IOs and RWEs on the network. The IOs 122, 124 may be locally stored on the device 104 or stored remotely on some node or datastore accessible to the W4 COMN, such as a message server or cell phone service datacenter. The IO 126 associated with the vehicle 108 may be an electronic file containing the specifications and/or current status of the vehicle 108, such as make, model, identification number, current location, current speed, current condition, current owner, etc. The IO 128 associated with sensor 108 may identify the current state of the subject(s) monitored by the sensor 108, such as current weather or current traffic. The IO 130 associated with the cell phone 110 may be information in a database identifying recent calls or the amount of charges on the current bill.

Furthermore, those RWEs which can only interact with the W4 COMN through proxies, such as the people 102, 140, 142, 144, computing devices 104, 106 and location 112, may have one or more IOs 132, 134, 146, 148, 150 directly associated with them. An example includes IOs 132, 134 that contain contact and other RWE-specific information. For example, a person's IO 132, 146, 148, 150 may be a user profile containing email addresses, telephone numbers, physical addresses, user preferences, identification of devices and other RWEs associated with the user, records of the user's past interactions with other RWE's on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.). Another example of a person's IO 132, 146, 148, 150 includes remote applications through which a person can communicate with the W4 COMN such as an account with a web-based email service such as Yahoo! Mail. The location's IO 134 may contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In order to correlate RWEs and IOs to identify relationships, the W4 COMN makes extensive use of existing metadata and generates additional metadata where necessary. Metadata is loosely defined as data that describes data. For example, given an IO such as a music file, the core, primary or object data of the music file is the actual music data that is converted by a media player into audio that is heard by the listener. Metadata for the same music file may include data identifying the artist, song, etc., album art, and the format of the music data. This metadata may be stored as part of the music file or in one or more different IOs that are associated with the music file or both. In addition, W4 metadata for the same music file may include the owner of the music file and the rights the owner has in the music file. As another example, if the IO is a picture taken by an electronic camera, the picture may include in addition to the primary image data from which an image may be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 2:
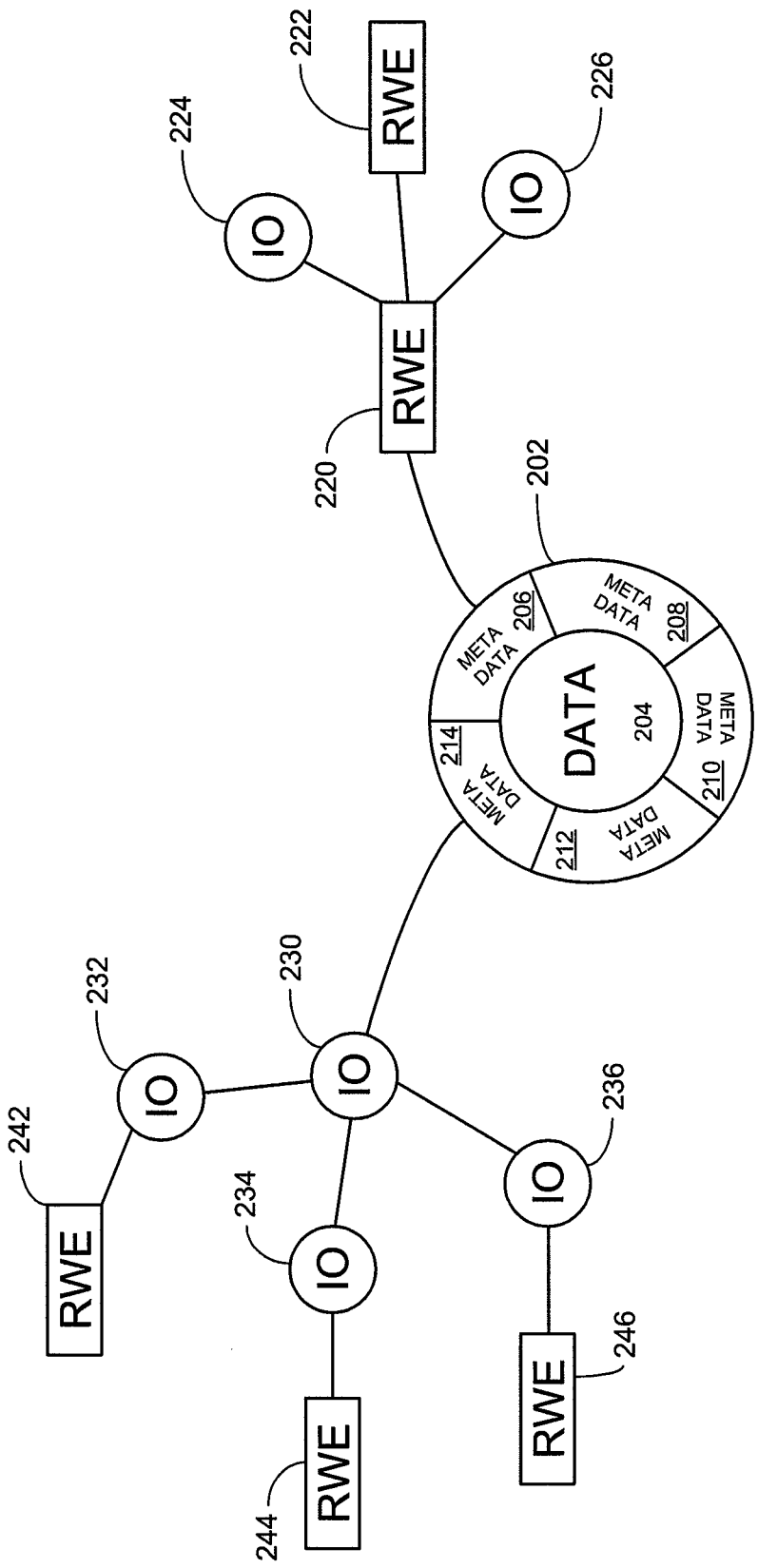
FIG. 2 illustrates an example of metadata defining the relationships between RWEs and IOs on the W4 COMN.

FIG. 2 illustrates an example of metadata defining the relationships between RWEs and IOs on the W4 COMN. In the embodiment shown, an IO 202 includes object data 204 and five discrete items of metadata 206, 208, 210, 212, 214. Some items of metadata 208, 210, 212 may contain information related only to the object data 204 and unrelated to any other IO or RWE. For example, a creation date, text or an image that is to be associated with the object data 204 of the IO 202.

Some of items of metadata 206, 214, on the other hand, may identify relationships between the IO 202 and other RWEs and IOs. As illustrated, the IO 202 is associated by one item of metadata 206 with an RWE 220 that RWE 220 is further associated with two IOs 224, 226 and a second RWE 222 based on some information known to the W4 COMN. This part of FIG. 2, for example, could describe the relations between a picture (IO 202) containing metadata 206 that identifies the electronic camera (the first RWE 220) and the user (the second RWE 224) that is known by the system to be the owner of the camera 220. Such ownership information may be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
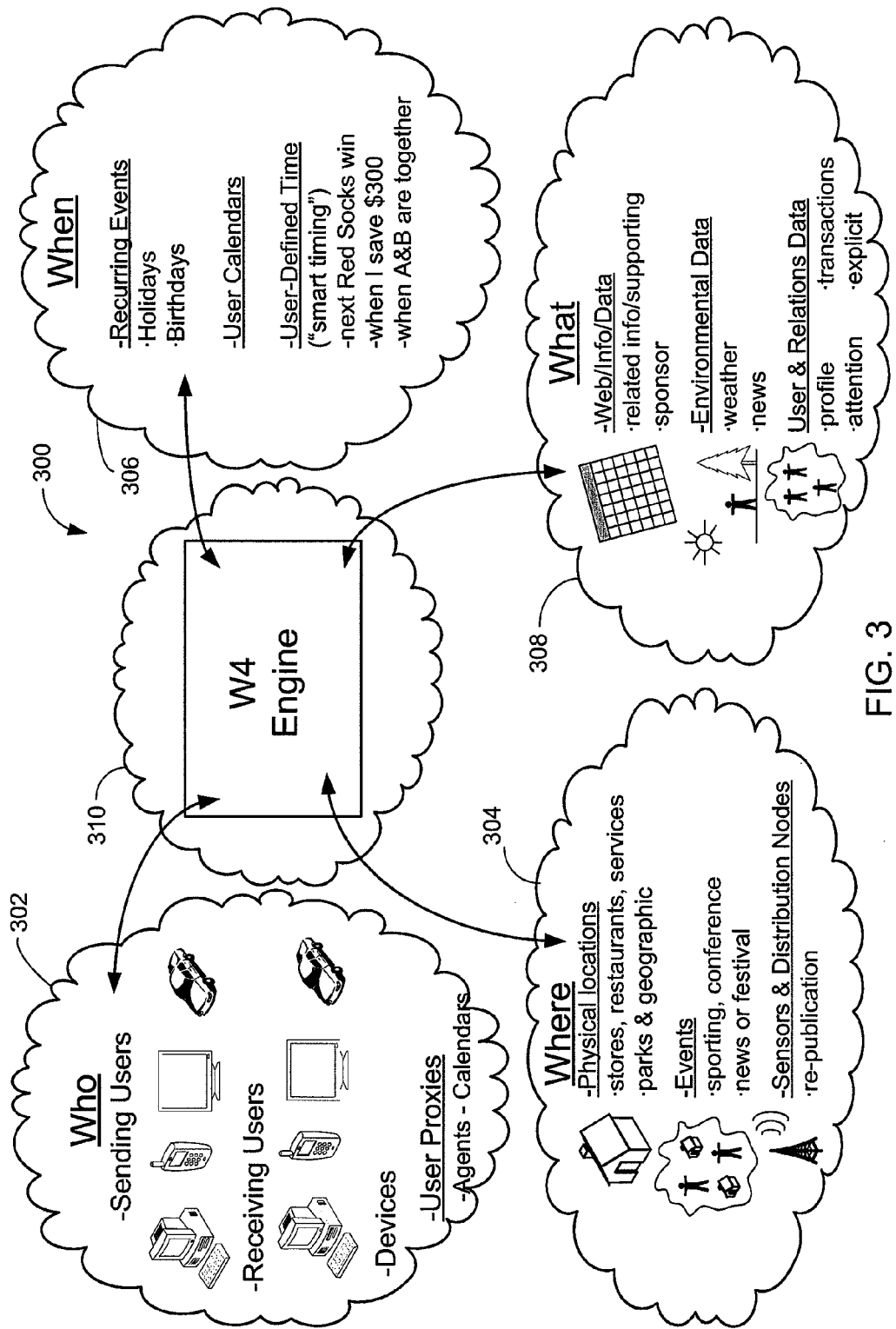
FIG. 3 illustrates a conceptual model of the W4 COMN.

FIG. 3 illustrates a conceptual model of the W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc. In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs). The What cloud 308 is comprised of all known data—web or private, commercial or user-accessible to the W4 COMN, including for example environmental data like weather and news, RWE-generated data, IOs and IO data, user data, models, processes and applications. Thus, conceptually, most data is contained in the What cloud 308.

As this is just a conceptual model, it should be noted that some entities, sensors or data will naturally exist in multiple clouds either disparate in time or simultaneously. Additionally, some IOs and RWEs may be composites in that they combine elements from one or more clouds. Such composites may be classified or not as appropriate to facilitate the determination of associations between RWEs and IOs. For example, an event consisting of a location and time could be equally classified within the When cloud 306, the What cloud 308 and/or the Where cloud 304.

The W4 engine 310 is the center of the W4 COMN's central intelligence for making all decisions in the W4 COMN. An "engine" as referred to herein is meant to describe a software, hardware or firmware (or combinations thereof) system, process or functionality that performs or facilitates the processes, features and/or functions described herein (with or without human interaction or augmentation). The W4 engine 310 controls all interactions between each layer of the W4 COMN and is responsible for executing any approved user or application objective enabled by W4 COMN operations or interoperating applications. In an embodiment, the W4 COMN is an open platform upon which anyone can write an application. To support this, it includes standard published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which may include storing copies of IOs and information identifying all RWEs and other information related to the IOs (e.g., who, what, when, where information). Other data collected by the W4 COMN may include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with and current status).

The W4 engine 310 is also responsible for identifying RWEs and relationships between RWEs and IOs from the data and communication streams passing through the W4 COMN. The function of identifying RWEs associated with or implicated by IOs and actions performed by other RWEs is referred to as entity extraction. Entity extraction includes both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only W4 metadata related to the object (e.g., date of creation, owner, recipient, transmitting and receiving RWEs, type of IO, etc.), but no knowledge of the internals of the IO (i.e., the actual primary or object data contained within the object). Knowing the content of the IO does not prevent W4 data about the IO (or RWE) to be gathered. The content of the IO if known can also be used in entity extraction, if available, but regardless of the data available entity extraction is performed by the network based on the available data. Likewise, W4 data extracted around the object can be used to imply attributes about the object itself, while in other embodiments, full access to the IO is possible and RWEs can thus also be extracted by analyzing the content of the object, e.g. strings within an email are extracted and associated as RWEs for use in determining the relationships between the sender, user, topic or other RWE or IO impacted by the object or process.

In an embodiment, the W4 engine 310 represents a group of applications executing on one or more computing devices that are nodes of the W4 COMN. For the purposes of this disclosure, a computing device is a device that includes a processor and memory for storing data and executing software (e.g., applications) that perform the functions described. Computing devices may be provided with operating systems that allow the execution of software applications in order to manipulate data.

In the embodiment shown, the W4 engine 310 may be one or a group of distributed computing devices, such as general-purpose personal computers (PCs) or purpose built server computers, connected to the W4 COMN by suitable communication hardware and/or software. Such computing devices may be a single device or a group of devices acting together. Computing devices may be provided with any number of program modules and data files stored in a local or remote mass storage device and local memory (e.g., RAM) of the computing device. For example, as mentioned above, a computing device may include an operating system suitable for controlling the operation of a networked computer, such as the WINDOWS XP or WINDOWS SERVER operating systems from MICROSOFT CORPORATION.

Some RWEs may also be computing devices such as smart phones, web-enabled appliances, PCs, laptop computers, and personal data assistants (PDAs). Computing devices may be connected to one or more communications networks such as the Internet, a publicly switched telephone network, a cellular telephone network, a satellite communication network, a wired communication network such as a cable television or private area network. Computing devices may be connected any such network via a wired data connection or wireless connection such as a wi-fi, a WiMAX (802.36), a Bluetooth or a cellular telephone connection.

Local data structures, including discrete IOs, may be stored on a mass storage device (not shown) that is connected to, or part of, any of the computing devices described herein including the W4 engine 310. For example, in an embodiment, the data backbone of the W4 COMN, discussed below, includes multiple mass storage devices that maintain the IOs, metadata and data necessary to determine relationships between RWEs and IOs as described herein. A mass storage device includes some form of computer-readable media and provides non-volatile storage of data and software for retrieval and later use by one or more computing devices. Although the description of computer-readable media contained herein refers to a mass storage device, such as a hard disk or CD-ROM drive, it should be appreciated by those skilled in the art that computer-readable media can be any available media that can be accessed by a computing device.

By way of example, and not limitation, computer-readable media may comprise computer storage media and communication media. Computer storage media include volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassette, magnetic tape, magnetic disk storage or other magnetic storage devices, or any other medium which can be used to store the desired information and which can be accessed by the computer.

Figure 4:
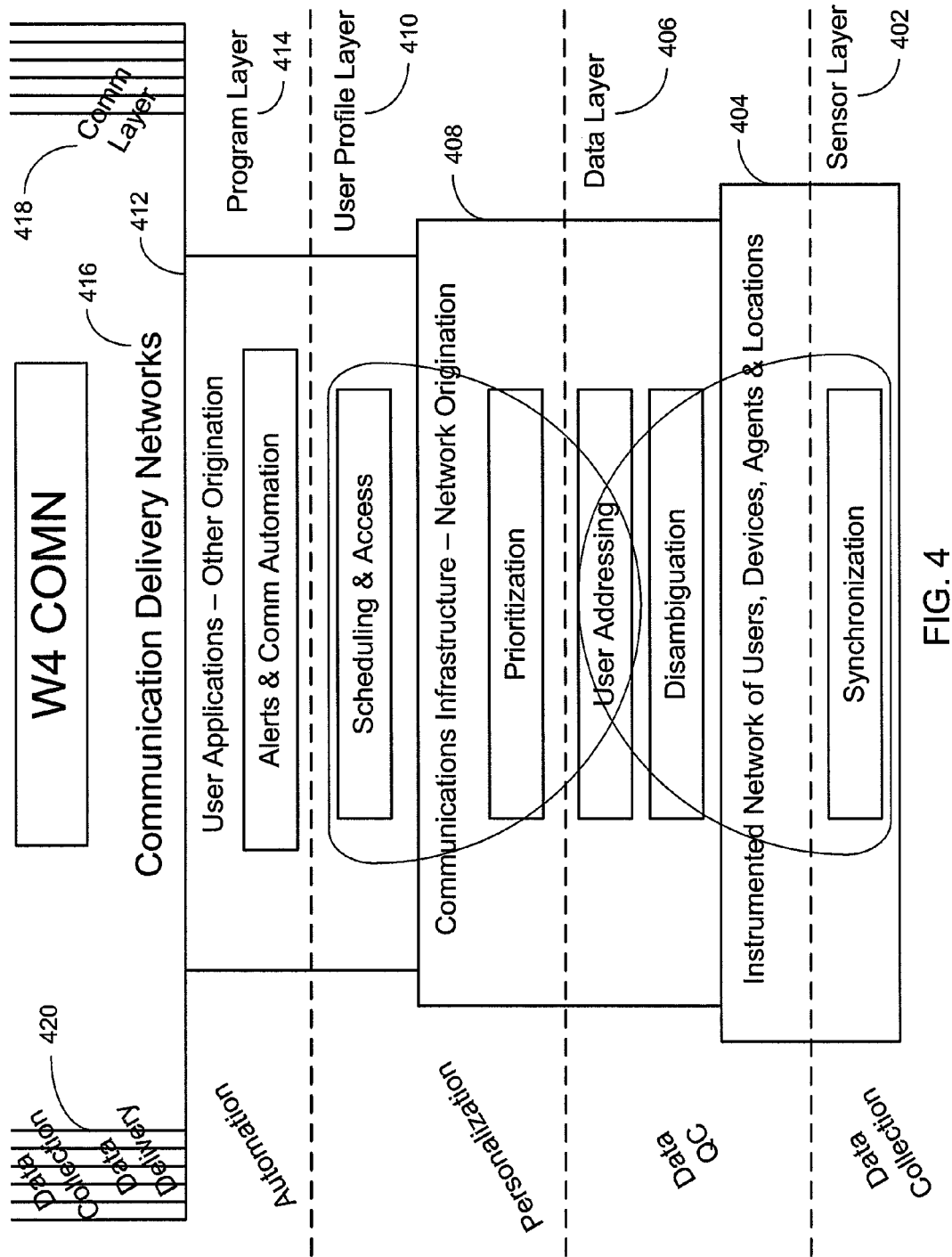
FIG. 4 illustrates the functional layers of the W4 COMN architecture.

FIG. 4 illustrates the functional layers of the W4 COMN architecture. At the lowest layer, referred to as the sensor layer 402, is the network 404 of the actual devices, users, nodes and other RWEs. The instrumentation of the network nodes to utilize them as sensors includes known technologies like web analytics, GPS, cell-tower pings, use logs, credit card transactions, online purchases, explicit user profiles and implicit user profiling achieved through behavioral targeting, search analysis and other analytic models used to optimize specific network applications or functions.

The next layer is the data layer 406 in which the data produced by the sensor layer 402 is stored and cataloged. The data may be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive and transmit data from the sensors, devices, etc. of the network 404. It further includes the processing and storage capability necessary to meaningfully categorize and track the data created by the network 404.

The next layer of the W4 COMN is the user profiling layer 410. This layer 410 may further be distributed between the network infrastructure 408 and user applications/processes 412 executing on the W4 engine or disparate user computing devices. In the user profiling layer 410 that functions as W4 COMN's user profiling layer 410. Personalization is enabled across any single or combination of communication channels and modes including email, IM, texting (SMS, etc.), photoblogging, audio (e.g. telephone call), video (teleconferencing, live broadcast), games, data confidence processes, security, certification or any other W4 COMN process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available to all processes of all applications approved on the W4 COMN. All network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from anything other than the network, e.g., RWEs such as users, locations, proxies and processes, come from the program layer 414 of the W4 COMN. Some applications may be developed by the W4 COMN operator and appear to be implemented as part of the communications infrastructure 408, e.g. email or calendar programs because of how closely they operate with the sensor processing and user profiling layer 410. The applications 412 also serve some role as a sensor in that they, through their actions, generate data back to the data layer 406 via the data backbone concerning any data created or available due to the applications execution.

The applications layer 414 also provides a personalized user interface (UI) based upon device, network, carrier as well as user-selected or security-based customizations. Any UI can operate within the W4 COMN if it is instrumented to provide data on user interactions or actions back to the network. This is a basic sensor function of any W4 COMN application/UI, and although the W4 COMN can interoperate with applications/UIs that are not instrumented, it is only in a delivery capacity and those applications/UIs would not be able to provide any data (let alone the rich data otherwise available from W4-enabled devices.)

In the case of W4 COMN mobile devices, the UI can also be used to confirm or disambiguate incomplete W4 data in real-time, as well as correlation, triangulation and synchronization sensors for other nearby enabled or non-enabled devices. At some point, the network effects of enough enabled devices allow the network to gather complete or nearly complete data (sufficient for profiling and tracking) of a non-enabled device because of it's regular intersection and sensing by enabled devices in it's real-world location.

Above the program layer 414 (and sometimes hosted within it) is the communications delivery network(s) 416. This can be operated by the W4 COMN operator or be an independent third-party carrier service, but in either case it functions to deliver the data via synchronous or asynchronous communication. In every case, the communication delivery network 414 will be sending or receiving data (e.g., http or IP packets) on behalf of a specific application or network infrastructure 408 request.

The communication delivery layer 418 also has elements that act as sensors including W4 entity extraction from telephone calls, emails, blogs, etc. as well as specific user commands within the delivery network context, e.g., "save and prioritize this call" said before end of call may trigger a recording of the previous conversation to be saved and for the W4 entities within the conversation to be analyzed and increased in weighting prioritization decisions in the personalization/user profiling layer 410.

Figure 5:
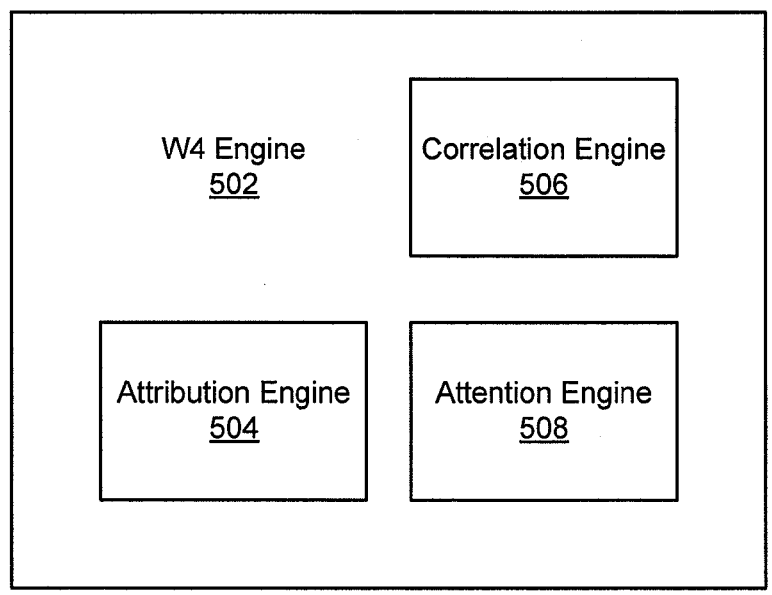
FIG. 5 illustrates an embodiment of analysis components of a W4 engine as shown in FIG. 2.

FIG. 5 illustrates an embodiment of analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. One such sub-engine is an attribution engine 504. The attribution engine 504 tracks the real-world ownership, control, publishing or other conditional rights of any RWE in any IO. Whenever a new IO is detected by the W4 engine 502, e.g., through creation or transmission of a new message, a new transaction record, a new image file, etc., ownership is assigned to the IO. The attribution engine 504 creates this ownership information and further allows this information to be determined for each IO known to the W4 COMN.

The W4 engine 502 further includes a correlation engine 506. The correlation engine 506 operates in two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data. In this embodiment, a histogram of all RWEs and IOs is created, from which correlations based on the graph may be made. Graphing, or the act of creating a histogram, is a computer science method of identifying a distribution of data in order to identify relevant information and make correlations between the data. In a more general mathematical sense, a histogram is simply a mapping $m_i$ that counts the number of observations that fall into various disjoint categories (known as bins), whereas the graph of a histogram is merely one way to represent a histogram. By selecting each IO, RWE, and other known parameters (e.g., times, dates, locations, etc.) as different bins and mapping the available data, relationships between RWEs, IOs and the other parameters can be identified.

As a pre-processor, the correlation engine 506 monitors the information provided by RWEs in order to determine if any conditions are identified that may trigger an action on the part of the W4 engine 502. For example, if a delivery condition has been associated with a message, when the correlation engine 506 determines that the condition is met, it can transmit the appropriate trigger information to the W4 engine 502 that triggers delivery of the message.

The attention engine 508 instruments all appropriate network nodes, clouds, users, applications or any combination thereof and includes close interaction with both the correlation engine 506 and the attribution engine 504.

Figure 6:
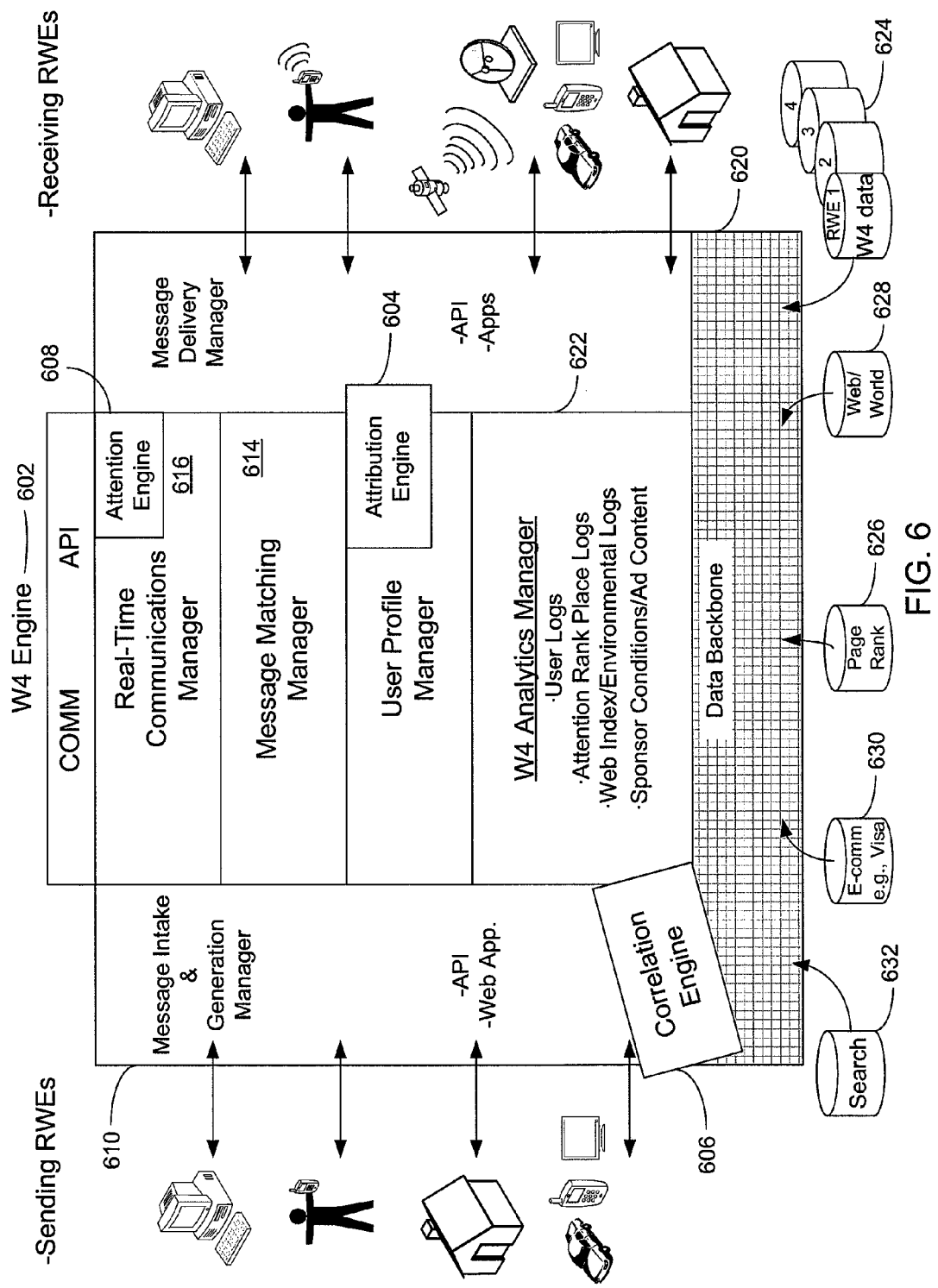
FIG. 6 illustrates an embodiment of a W4 engine showing different components within the sub-engines described generally above with reference to FIG. 5.

FIG. 6 illustrates an embodiment of a W4 engine showing different components within the sub-engines described generally above with reference to FIG. 4. In one embodiment the W4 engine 600 includes an attention engine 608, attribution engine 604 and correlation engine 606 with several sub-modules/managers based upon basic function.

The attention engine 608 includes a message intake and generation manager 610 as well as a message delivery manager 612 that works closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622 and includes both aggregated and individualized archived versions of data from all network operations including user logs 624, attention rank place logs 626, web indices and environmental logs 618, e-commerce and financial transaction information 630, search indexes and logs 632, sponsor content or conditionals, ad copy and any and all other data used in any W4 COMN process, IO or event. Because of the amount of data that the W4 COMN will potentially store, the data backbone 620 includes numerous database servers and datastores in communication with the W4 COMN to provide sufficient storage capacity.

As discussed above, the data collected by the W4 COMN includes spatial data, temporal data, RWE interaction data, IO content data (e.g., media data), and user data including explicitly-provided and deduced social and relationship data. Spatial data may be any data identifying a location associated with an RWE. For example, the spatial data may include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relates to specific times and/or events associated with a user and/or the electronic device. For example, the temporal data may be passively collected time data (e.g., time data from a clock resident on the electronic device, or time data from a network clock), or the temporal data may be actively collected time data, such as time data entered by the user of the electronic device (e.g., a user maintained calendar).

The interaction data may be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
| --- | --- | --- |
| Cell tower data | Time stamps | Interpersonal |
| GPRS data | Local clock | communication data |
| GPS data | Network clock | Media data |
| WiFi data | User input of | Relationship data |
| Personal area network data | time data | Transactional data |
| Network access points data | | Device interaction data |
| User input of location data | | |
| Geo-coordinates data | | |

With respect to the interaction data, communications between any RWEs may generate communication data that is transferred via the W4 COMN. For example, the communication data may be any data associated with an incoming or outgoing short message service (SMS) message, email message, voice call (e.g., a cell phone call, a voice over IP call), or other type of interpersonal communication relative to an RWE, such as information regarding who is sending and receiving the communication(s). As described above, communication data may be correlated with, for example, temporal data to deduce information regarding frequency of communications, including concentrated communication patterns, which may indicate user activity information.

Logical and IO data refers to the data contained by an IO as well as data associated with the IO such as creation time, owner, associated RWEs, when the IO was last accessed, etc. If the IO is a media object, the term media data may be used. Media data may include any data relating to presentable media, such as audio data, visual data, and audiovisual data. For example, the audio data may be data relating to downloaded music, such as genre, artist, album and the like, and includes data regarding ringtones, ringbacks, media purchased, playlists, and media shared, to name a few. The visual data may be data relating to images and/or text received by the electronic device (e.g., via the Internet or other network). The visual data may be data relating to images and/or text sent from and/or captured at the electronic device. The audiovisual data may be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data may include data relating to the user's RSS feeds, subscriptions, group memberships, game services, alerts, and the like. The media data also includes non-network activity, such as image capture and/or video capture using an electronic device, such as a mobile phone. The image data may include metadata added by the user, or other data associated with the image, such as, with respect to photos, location when the photos were taken, direction of the shot, content of the shot, and time of day, to name a few. As described in further detail below, media data may be used, for example, to deduce activities information or preferences information, such as cultural and/or buying preferences information.

The relationship data may include data relating to the relationships of an RWE or IO to another RWE or IO. For example, the relationship data may include user identity data, such as gender, age, race, name, social security number, photographs and other information associated with the user's identity. User identity information may also include e-mail addresses, login names and passwords. Relationship data may further include data identifying explicitly associated RWEs. For example, relationship data for a cell phone may indicate the user that owns the cell phone and the company that provides the service to the phone. As another example, relationship data for a smart car may identify the owner, a credit card associated with the owner for payment of electronic tolls, those users permitted to drive the car and the service station for the car.

Relationship data may also include social network data. Social network data includes data relating to any relationship that is explicitly defined by a user or other RWE, such as data relating to a user's friends, family, co-workers, business relations, and the like. Social network data may include, for example, data corresponding with a user-maintained electronic address book. Relationship data may be correlated with, for example, location data to deduce social network information, such as primary relationships (e.g., user-spouse, user-children and user-parent relationships) or other relationships (e.g., user-friends, user-co-worker, user-business associate relationships). Relationship data also may be utilized to deduce, for example, activities information.

The interaction data may also include transactional data. The transactional data may be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data may be utilized, for example, to deduce activities and preferences information. The transactional information may also be used to deduce types of devices and/or services the user owns and/or in which the user may have an interest.

The interaction data may also include device or other RWE interaction data. Such data includes both data generated by interactions between a user and a RWE on the W4 COMN and interactions between the RWE and the W4 COMN. RWE interaction data may be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data may be correlated with other data to deduce information regarding user activities and patterns associated therewith. Table 2, below, is a non-exhaustive list including examples of interaction data.

TABLE 2

Examples of Interaction Data

| Type of Data | Example(s) |
| --- | --- |
| Interpersonal communication data | Text-based communications, such as SMS and e-mail<br>Audio-based communications, such as voice calls, voice notes, voice mail<br>Media-based communications, such as multimedia messaging service (MMS) communications<br>Unique identifiers associated with a communication, such as phone numbers, e-mail addresses, and network addresses |
| Media data | Audio data, such as music data (artist, genre, track, album, etc.)<br>Visual data, such as any text, images and video data, including Internet data, picture data, podcast data and playlist data<br>Network interaction data, such as click patterns and channel viewing patterns |
| Relationship data | User identifying information, such as name, age, gender, race, and social security number<br>Social network data |
| Transactional data | Vendors<br>Financial accounts, such as credit cards and banks data<br>Type of merchandise/services purchased<br>Cost of purchases<br>Inventory of purchases |
| Device interaction data | Any data not captured above dealing with user interaction of the device, such as patterns of use of the device, applications utilized, and so forth |

Ranking Attention Using W4 Data

One notable aspect of the W4 COMN is the ability to use W4 data to rank any identifiable IO and RWE based on the actual attention they receive from users as determined by the W4 data. The attention rank engine (described below) combines web data with entity attention data to create a combined and complete unique ID model and ranking ability for places, events, objects and people that incorporates both web data as well as actual user-generated data in real time and space. The resulting combined ranking can be used in the aggregate or personalized along any W4 vector (including sponsor campaigns).

The attention rank systems and methods described herein are particularly useful in countering problems created by using standard web page ranking techniques as a means for ranking web pages and their subject matter/content. Web page ranking techniques are well known in the art and often rely on such vectors as number of user visits or clicks on a web page, number of links to the web page, etc. Such web-based techniques are applicable only to subject matter and content that is somehow represented online. Another drawback of such ranking techniques is that they can be skewed, manipulated or subverted, both accidentally and on purpose, e.g., by those attempting to inflate the rank of a particular web page in a search query. Furthermore, web-based techniques inherently rank web pages based only on one perspective: that of online community and users' online actions.

The W4 engine is adapted to analyze the W4 data in order to rank different RWEs known to the W4 COMN. In an embodiment, the modules and components that work together primarily to rank RWEs based on user attention are referred to collectively as the attention rank engine. The attention rank engine (ARE) uses physical world attention as a declaration of interest, analogous to the declaration of interest represented by a search term resulting in sponsored search ads, to create a new actionable network for capturing and modeling human and online attention into a singular rank for purposes of matching to entities, users or queries.

In the world every RWE can be considered to have a natural rank based upon popularity and the nature and quality of the attention given by users to the person, place, thing, event, etc. In every city, there is a number one pizza restaurant, a number seven dry cleaners and a number 22 oil change place, and yet this data is neither captured nor modeled effectively to be includable with web data about the same real-world stores online. For example, the pizza shop may have a website, and it may be reviewed well by users on that site or other city guide sites, but it's ranking in search results through search engines does not take into account that it has the most traffic, the most revenue and/or the most repeat customers of any pizza place in the city.

Combining the actual data that is picked up through the W4 COMN, a model of information objects is created that maps web objects/web pages to RWEs to combine data from both worlds (i.e., the online world and the real world) in order to increase the efficiency, accuracy and dynamic evolution of matching users to other RWEs including other users, businesses, things events, etc.

Everything in the world can be assigned an attention rank by combining and weighting the online data about that RWE with all known data obtained from offline sources about the same RWE. Attention is recorded in the real world by devices, activities, communications, transactions and sensors while attention is recorded online by browsers and devices and carriers and Network operators, activities, communications, transactions and instrumented pages or networks.

The ARE interacts with the web-world and the clouds 302, 304, 306, 308 of the real world shown in FIG. 3 as sources for data about users, objects and their attributes/relations in each respective sphere of existence. By modeling both the real world and the online world, the ARE combines data from multiple possible sources, weighting them based upon behavior in real-time to produce a combined ranking for total User attention both online and offline. This ranking can be aggregated for all users or personalized in order to provide an individual attention rank for each known user in every context with every RWE.

Figure 7:
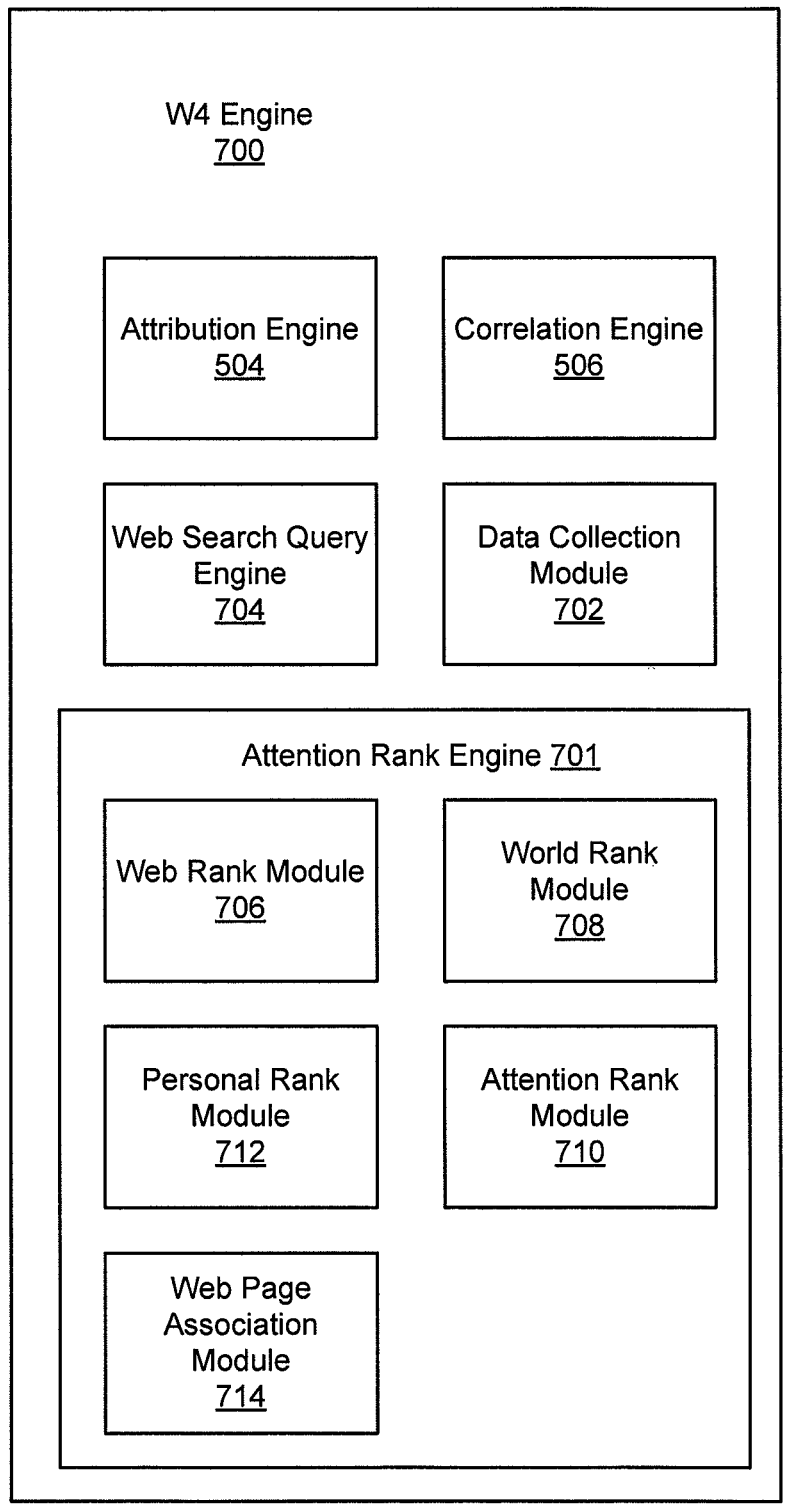
FIG. 7 illustrates elements of an embodiment of a W4 engine adapted to rank attention using W4 data as described herein.

FIG. 7 illustrates elements of an embodiment of a W4 engine adapted to rank attention using W4 data as described herein. The W4 engine 700 includes a correlation engine 506 and an attribution engine 504 as described above with reference to FIG. 5. The W4 engine 700 is further provided with a data collection module 702 that collects W4 data from communications on the various communication channels interoperating with the W4 COMN. The data collection module 702 collects and stores user data from communications transmitted by the RWEs. Such data may include the number of communications, the communication channel, and the subject of the communication. In addition, as described elsewhere, the data may be analyzed to determine additional information and identify any RWEs and/or IOs related to a particular communication.

When collecting and analyzing W4 data, as discussed above, it should be understood that multiple RWEs and IOs may be associated with a single communication as a sender, recipient and/or subject or other related party. For example, a user may create and send an email message using a laptop computer. The user is an RWE having a unique W4 identifier. In addition, the laptop is an RWE with its own unique W4 identifier. The email application on the laptop may be tracked as an IO with its own unique W4 identifier. Furthermore, the laptop computer may be wirelessly connected to a communication network by a wireless router, which is an RWE with a unique W4 identifier, at a known location (yet another RWE with a unique identifier), corresponding to one or more businesses (each being another RWE with unique identifiers). In addition, the email may be sent at a specific time during which other cell phones (each being another RWE with its own unique W4 identifier) were recorded as being at the same location. In an embodiment, some or all of the user, laptop computer and email application may be considered a sender of the IO that is the email message. In this case, the user may be considered the originating sender and the laptop and email application proxies for the originating sender.

The concept of proxies was discussed above and is particularly important here where it is anticipated that human actors, either as senders, recipients, purchasers, attendees or entities related to a communication, will be known to the W4 COMN primarily through information obtained from their proxies (e.g., proxy RWEs, such as their smart phones, computing devices, sensors, smart vehicles, home phones, physical credit cards, etc., and proxy IOs such as email accounts, communication software, credit card accounts, data objects containing data generated by a RWE, data objects containing data about an RWE or event, etc.).

In an embodiment, this determination of the users related to a communication, including determining who the user, if any, is that should be considered the original sender, purchaser, recipient, passerby, or attendee may be performed by the W4 engine 700. For example, the attribution engine 504, as described above, may identify the ultimate human sender and recipient of communications. It should also be noted that some messages may be sent by a process programmatically, e.g., automatically during the course of the execution of a program, so that there is not a human sender to be identified but rather only a sender IO. Alternatively, the attribution engine 504 may only identify the sending proxy RWE that actually places the message into the W4 COMN and any other associated RWEs (e.g., other proxies and/or originating sender) may be identified by the correlation engine 506. In this alternative, the correlation engine 506 may analyze some or all the W4 collected by the data collection module 702 in order to identify all RWEs that are associated with each communication and what the nature of the association, underlying action or relationship is based on the communication. For example, a communication indicating that a purchase was made with physical credit card at a business may be used to identify a relationship between the purchaser (i.e., the person for which the physical credit card is a proxy) and the business (i.e., the RWE associated with the account credited with the transaction).

The W4 engine 700, upon receipt of a communication, records all the relevant communication data and may further analyze the data to generate additional information for later use as described below. This may include requesting that the correlation engine 506 correlate the channel-specific identifiers of the senders, recipients, etc. with other W4 data in order to identify all RWEs, particularly human users, if any, related to the communication.

It should be understood that any human or non-networked entity that is a sender, recipient, subject or related party of a communication may be identified only by proxy RWEs or IOs. For example, an email may be sent by or directed to "john.smith@yahoo.com" or a telephone call may be directed to "(720)555-0505." In both cases, the identifiers (i.e., "john.smith-@yahoo.com" and "(720)555-0505") used to identify the human are identifiers of proxies of the actual intended human recipient. Based on the W4 data known to the W4 COMN, these identifiers of proxies may be analyzed, e.g., by the correlation engine 506, in order to determine the unique W4 identifier of the RWE that is accessed by, represented by or working through the proxy RWE or proxy IO. For example, "john.smith@yahoo.com" and "(720)555-0505" may be communication channel-specific identifiers of RWEs that the W4 COMN is aware are proxies for a known human RWE (e.g., a user already known to the W4 COMN) with a distinct unique W4 identifier.

The embodiment of the W4 engine 700 shown further includes an embodiment of an ARE 701 illustrating some of the components that may be incorporated within the ARE 701. In the embodiment shown the ARE 701 includes a set of modules that work together and perform different functions to rank the attention given different RWEs using W4 data. The ARE 701 produces attention ranks and personal ranks for different RWEs which can then be used for any purpose such as re-ranking of search results, selection of content/sponsored ads, and presenting information regarding physical entities and their physical entity rankings to users. Indeed, by providing a measure of actual user interest based on real-time data describing user's actual and online activities, the output of the ARE 701 can be used to improve the accuracy of any system, prediction or process which is related to user interests.

In the embodiment shown, the ARE 701 has four primary modules for integrating all known data: a world rank module 708, a web rank module 706, an attention rank module 710 and a personal rank module 712. In an alternative embodiment, the functions of the ARE 701 may be combined or divided into more or fewer modules and additional functionality may be included.

The world rank module 708 interoperates with one or more networks to gather data about users in the real world and model that data in such a way as to be ingested and combined with data from the web rank module 706 to form a combined graph of the global rank inside the attention rank module 710 which may be filtered down to an individuated form by the personal rank module 712 for the augmentation of search results or selection of content/sponsored content for presentation to a user.

The world rank module 708 accesses and analyzes the data collected from the real world by the data collection module 702. The world rank module 708 then uses the data to model real-world users' attention through devices, physical presence, transaction records and participation histories as well as any communications that may occur or be modeled by data produced by a user in the real-world.

In an embodiment, the output of the world rank module 708 is an entity rank for each RWE known to the system. The entity rank may be a relative rank or may be an absolute rank, depending on how operators of the system choose to implement the world rank module 708. Such an entity rank may be determined based on an analysis of all the data available at the time that entity rank is needed so that the rank reflects the most recent actions of RWEs as well as the past actions.

Combining the attention of users to, from or about something from place clouds, event clouds, thing/object clouds, node clouds, people clouds and any other real-world data producing network, the world rank module 708 models attention by any number of vectors including where, when, who, what (including objects, activities and everything else). The modeling is supported by the W4 COMN's system of assigning each RWE a unique W4 identifier which allows the RWEs which is associated with each communication known to the W4 COMN to be identified and the activities and user attention which those communications represent positively characterized.

In an embodiment, the web rank module 706 captures and stores all the data produced through a user's interaction with the Internet. In an alternative embodiment, a web logging engine, which may be considered part of the data collection module 702, collects data generated through online activities and this web data is simply accessed as needed by the web rank module 706. Such web data may include the addresses, rank(s), score(s), click-through rates, transaction history, server logs, topic, tags, ownership or rights, links or other associations, etc. and associates that data with the same unique W4 identifier used by the world rank module 708 for entities known to be the same. By probabilistically mapping web objects to real world items a system like UPC codes for products or social security numbers for humans is created, and a model is created to move the web data "from strings to objects."

In an embodiment the output of the web rank module 706 may include a web rank for web pages known to the system. For example, each web page, domain name, web object or grouping of web objects (hereinafter collectively referred to only as "web pages") may be considered an individual IO and provided its own unique W4 identifier. The web rank module 706 may then assign each web page a web rank based on an analysis of the web data.

In an embodiment, the attention rank module 710 uses the entity ranks and web ranks to generate a combined attention rank for each RWE and web page known to the system. In an alternative embodiment, the attention rank module 710 may take the data and models from both the world rank module 708 and the web rank module 706 to create a combined model for every object in both the real world and the web world. From the combined model, the attention rank module 710 then generates an attention rank for the RWEs and web pages. In most instances, an entity may only truly exist in one or the other while being represented in the other by one or more proxies. In those instances in which an entity truly does not have a presence or proxy in one or the other world, such an entity may still be assigned both a web and real world rank in which one is just the null set.

In the embodiment shown, a web page association module 714 is provided for determining what RWEs, if any, are associated with each particular web page. The web page association module 714 may search the content and other metadata associated with a web page to identify information that allows the web page to be correlated to one or more RWEs and from that correlation, the unique W4 identifier of the RWEs associated with a web page may be determined. For example, a home page for a pizza restaurant may include information in the text of the web page that allows the web page to be associated with the unique W4 identifier for the restaurant. With this identification, it is possible for the attention rank module 710 to combine the web rank and information (derived from such data as number of hits, unique user page views, click-throughs, etc.) associated with the restaurant's home page and the entity rank and information (derived from such data as credit card purchases, hours spent by users at the restaurant, number of calls to the restaurants delivery order telephone number, etc.) for the actual restaurant. In an embodiment, some web pages may include metadata that identifies the RWEs to be associated with the web page for attention rank purposes. Alternatively, the web page association module 714 may identify the associated RWEs by an analysis of the content of the web page, such as keyword and address mapping.

The attention rank module 710 can evenly combine the web and real world data for a combined ranking, or it may weight one world higher than the other, or it may even apply a differentiated ranking to both web and real-world events to create a unique set of ranking factors to produce a final ranking for an item in a specific context, e.g. in response to a query, user request or user comparison.

The attention rank module 710 may also act like a traffic aggregation center for real-time attention on both the web and in the real world, and as such, may be able to provide an aggregated picture of current attention by all users or any logically definable subset of users or attention (e.g., user demographic). This data can be shared with other components in the W4 COMN or third party applications for many services, including displaying attention via mapping.

The personal rank module 712 can be considered a filter that identifies a personal attention rank (hereinafter a "personal rank") which is relative to a specific user and takes into account the relative importance of that user's known relationships with other RWEs and IOs. Thus, if a user's circle of friends are determined to be giving significant attention to a particular musician, coffee shop or movie, the personal rank for these RWEs would reflect that information. The personal rank module 712 applies some dimension of filters to the global attention rank model to form a personal attention rank graph which is then used as the filter for any/all attention ranking activities. The personalization filter's attributes can be programmed automatically by the W4 COMN based on known relationships and/or by the user directly, or may even be open-sourced for third party development. Such filters may be static (only changed through explicit instructions) or dynamic (automatically update themselves based upon use, user status, etc.).

The ARE 701 can be completely behind-the-scenes, interoperating with existing applications and systems for search and other services, or it could also provide it's own specialized self-serve applications for attention rank operations. For example, in the embodiment shown the W4 engine 700 includes a web search query engine 704. The web search query engine 704 interacts with users searching the web by receiving search queries, such as in the form of a string of keywords, and searching web pages or an index of web pages for those pages that match the search query, which may include retrieving information from the web rank module 706. Upon determining the results of the web search, the web search query engine may retrieve the attention rank for each web page in the web page query result and present the web page query result based on the attention rank of the web pages in the results set.

As the reader can see, in this embodiment the web search query engine 704 may work closely with all the various modules of the ARE 701 as opposed to ranking web search results based only on web data and web rank information. Furthermore, the query results may be further tailored to personal tastes by using the personal rank as well as the web rank and entity rank.

An attention rank system can include one or more ARE 701 specialized for specific areas, users or topics, or those specializations can be contained within a singular ARE in the form of varying attention rank models. These models provide the instructions for processing real world data into an attention data model.

In one embodiment, an attention model data structure may include at least the fields for "From," "To," and "About" for every instance of attention being modeled. In another embodiment, another field representing the type and role of attention being modeled are also included.

In an embodiment, the personal rank module 712 uses the ARE's 701 attention models as the base for creating a user's individual filters, i.e. a personal attention model that includes any personal preferences for both collecting attention data about a user but also which types of attention data the user would like to be included within his/her own attention personalization filters.

Thus, each ARE 701 may use a specific attention model to define the context for processing any request, and the context creates the taxonomy and weighting conditions for attention types. For example, in certain contexts, one type of attention may be valued over another, e.g. user's looking at a painting vs. user's taking a digital photo of it.

By modeling the types and forms of attention, the resistance and affordance of both the entity rank and the web rank can be combined including the W4 data of attention that creates a unique graph to graph n-dimensional topology. In one embodiment, this topology representation may be used as a unique identifier for that object or attention vector.

So likewise the personal rank module 712 can use this data to calculate an attention distance between any user and any context to better augment results, content or services to the User in their specific context. Such an attention distance between users may be considered a measure of similarity of interests between users. Between a user and another RWE, the attention distance may be considered a measure of the relative importance of that RWE to the user. In some instances the actual topology of specific types of attention can be forecast to correlate with certain types of events, e.g. natural disasters, for use as a risk management tool.

Figure 8:
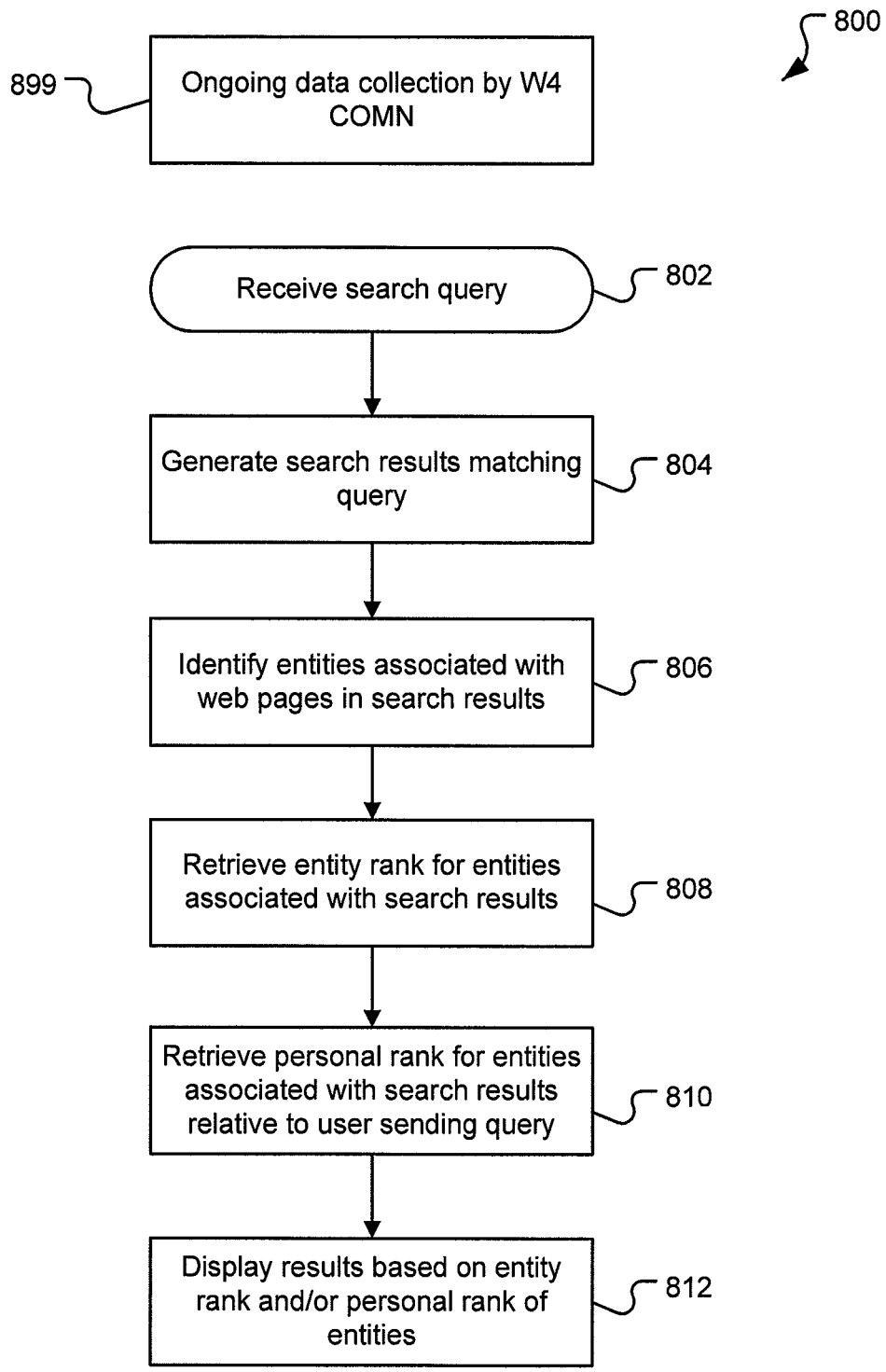
FIG. 8 illustrates an embodiment of a method for delivering messages over a network based on social, temporal, spatial and topical data for entities on the network.

FIG. 8 illustrates an embodiment of a method for ranking attention based on social, temporal, spatial and topical data for entities on a network. The method is described in the context of a web page query in which the attention rank information is used to modify the results of a web page query. This is but one use of attention rank information and the user will understand that such information may be adapted for any use in which decisions or actions may be taken based on differences in user actions and attention relative to RWEs. For example, attention rank information may be used to select content (online or offline) to be displayed to a user, advertisements to be displayed to a user, automatic reallocation of resources based on evidence of changing user demand as determined by relative increase or decrease in attention rank, identifying user interests, comparison of user demographics, presentation of ranked physical entities, and identification of valuable real and intangible property to name only a few.

In the embodiment described below, depending on how the architecture is implemented, the operations described may be performed by one or more of the various components, engines and modules described above. In addition, sub-engines may be created and used to perform specific operations in order to improve the network's performance as necessary.

As described above, a foundational aspect of the W4 COMN that allows for conditional message delivery is the ongoing collection and maintenance of W4 data from the RWEs interacting with the network. In an embodiment, this collection and maintenance is an independent operation 899 of the W4 COMN and thus current W4 social, temporal, spatial and topical data are always available for use in testing of delivery conditions. In addition, part of this data collection operation 899 includes the determination of ownership and the association of different RWEs with different IOs as described above including prioritization among specific groups or sub-groups of RWEs and IOs. Therefore, each IO is owned/controlled by at least one RWE with a known, unique identifier on the W4 COMN, and each IO may have many associations with other RWEs that are known to the W4 COMN.

In the embodiment shown, the method 800 is initiated when a search query is received in a receive query operation 802. Such a search query may be a request from a user for a listing of web pages matching a provided set of keywords or search terms. In an alternative embodiment, the search query may be a request for a listing of companies, service providers, or other entities that match certain criteria, e.g., "closest five star pizza", "best biking trails in Denver", "best bands playing tonight", and "best elk hunting in Colorado". In this case, such a request is not looking for web pages that most closely match the search criteria but rather for physical entities that match the search criteria.

Query requests may be generated by software on a computing device operated by a user or by an automated process. As discussed above, one or more RWEs (e.g., an RWE in the form of a device that is a known proxy for a another RWE such as a user) may be identified as a sender of the request. Such identifications may be made from the data of the request, the source of the request or a combination of both. In addition, deductions may be made concerning a user that is the sender of the request based on W4 data for the known device or software senders of the message, as previously described.

The method 800 shown then generates a set of search results for the query in a generate search result operation 804. The generate search results operation 804 includes searching the appropriate index or database of information, determining which items (e.g., web pages) match the search query based on a predetermined algorithm or matching program and generating a set of results for the search. The results may be a listing of web pages or a listing of RWEs depending on the query. In a web page search embodiment, the generation of a results set may include searching an index for web pages matching the query and further generating a web rank for each web page based how well the web page content matches the search query in addition to other factors that may impact the web rank of a web page as discussed above, e.g., popularity of the web page, number of hits, etc.

The generate search results operation 804 operation may include generating a web rank based on the query as is known in the art. Such web ranks have been described in greater detail above and any suitable method for generating a web rank for a web page based on information known about the web page and its similarity to the terms and conditions of a search query may be used.

In the web page search embodiment shown in FIG. 8, after generating the search results, the individual web pages in the set of results are analyzed to determine which RWE or RWEs are associated with each web page in an identify associated RWE operation 806. As discussed above, such association may have been previously determined, for example, when each web page was indexed and the relevant information for use in later search query matching was stored. For example, at the time a web page is indexed, its content may be analyzed and one or more RWEs may be selected as the RWEs to be associated with the web page; then the unique identifier(s) for the selected RWE(s) may be stored along with the web page's information in the index. Alternatively, the content of the web pages may be searched at the time the search query is received and the associated RWEs identified from the information contained in the index. In an embodiment, information indicating the type of association (e.g., the RWE is the subject of the web page, listed in the web page, etc.) may be determined as part of the identification operation 806.

The identification operation 806 may compare the contents of a web page to previously created RWE definitions developed from RWE communications with the W4 COMN. Based on the similarity between the contents of the web page and the RWE definition, a determination may be made that a specific entity (e.g., person, place, thing, location, event, etc.) discussed in the web page corresponds to a known RWE on the W4 COMN with a unique W4 identifier. This allows the identification operation 806 to not only identify entities discussed in web pages or other content, but also to determine the unique W4 identifier of the RWE that represents that entity on the W4 COMN, thereby allowing additional information about the entity derived from other sources to be found.

When the RWEs associated with the various web pages in the search results are known, an entity rank for each RWE may be retrieved using each RWEs unique identifier in a retrieve entity rank operation 808. Depending on the embodiment, the entity rank for each RWE may be determined prior to receiving the search request (e.g., the entity rank is periodically or occasionally generated based on the W4 data available at that time) or may be generated dynamically in response to a request by the attention rank engine for an entity rank. As discussed above, the entity rank is derived from W4 data which, in an embodiment, is obtained from sources other than web page content. It should be understood that in some circumstances W4 data may end up as content on web pages, but in the embodiment that data may or may not be retrieved from the web pages, but rather retrieved from the communications on the W4 COMN.

The entity rank for each RWE is used to modify how the search results are displayed in a display results operation 812. The display results operation 812 may include displaying the search results based on the web rank of the web pages in the search results and based on the entity rank for each RWE associated with each of the web pages. In an embodiment, a combined rank for each web page in the results set may be generated that takes into account both the web rank and the entity rank of any associated entity. For example, the two ranks may simply be added or multiplied together to determine a combined rank. In alternative embodiments, the combination may include preferentially weighting one or the other of the ranks. Such weighting may further be dynamically selected based on a type of search. For example, a query that appears to be focused on identifying a business may weight the entity rank higher, while a query that appears to be requesting information about RWEs for comparison purposes may weight web rank higher.

The display operation 812 may alter the order in which web pages are presented in the search results based on the web and entity ranks. Thus, this allows web pages whose subjects are highly popular RWEs but which, nonetheless, have low web ranks to appear higher earlier in the list of results. Alternatively, the display operation 812 may display information about the RWE associated with each web page, including, for example, the name and the entity rank of the RWE. Additional links may also be provided. For example, if the searching user can be identified from the query, a link to reviews of the RWE by people in the searcher's social network or by reviewers known to be consulted by the searcher in the past may be provided.

The embodiment shown in FIG. 8 further includes an optional retrieve personal rank operation 810 in which a personal rank for the RWEs associated with the various web pages in the search results is generated and retrieved. As discussed above, the personal rank is a ranking of RWEs from the perspective of and relative to the searching user. For example, such a personal rank may include taking into account information about a user's geographic location. For example, while Chicago-style pizza may be very important to a given user, because that user is currently in San Diego, Calif., the personal rank of pizza restaurants in San Diego may be higher than a pizza restaurant in Chicago. Similar to the entity rank, the personal rank may have been generated prior to the search query and merely retrieved when needed or may be generated dynamically on an as needed basis, which has the benefit of using the most up-to-date information.

If the personal rank is also retrieved, the display operation 812 uses this information and modifies the display of the search results accordingly. In an embodiment, a combined rank based on the web rank, entity rank and personal rank may be created. As discussed above, each different rank may be weighted differently in order to skew the combined rank.

Because personal rank and entity rank are a ranking of entities and not web pages, the ARE may continuously update the ranks as new information about users' actions is received from communications on the W4 COMN. Thus, as a given user's tastes change (as reflected by changes in the user's actions), the personal rank of various RWEs will change also. Likewise, as additional information related to RWEs are collected over time, changes in user actions indicating a change in popularity, use, or importance of an RWE relative to other RWEs of the same type and relative to all RWEs known to the system can be detected and automatically reflected in the entity rank. Thus, when a musical act becomes popular quickly, the entity and personal ranks will reflect such changes in real time.

Figure 9:
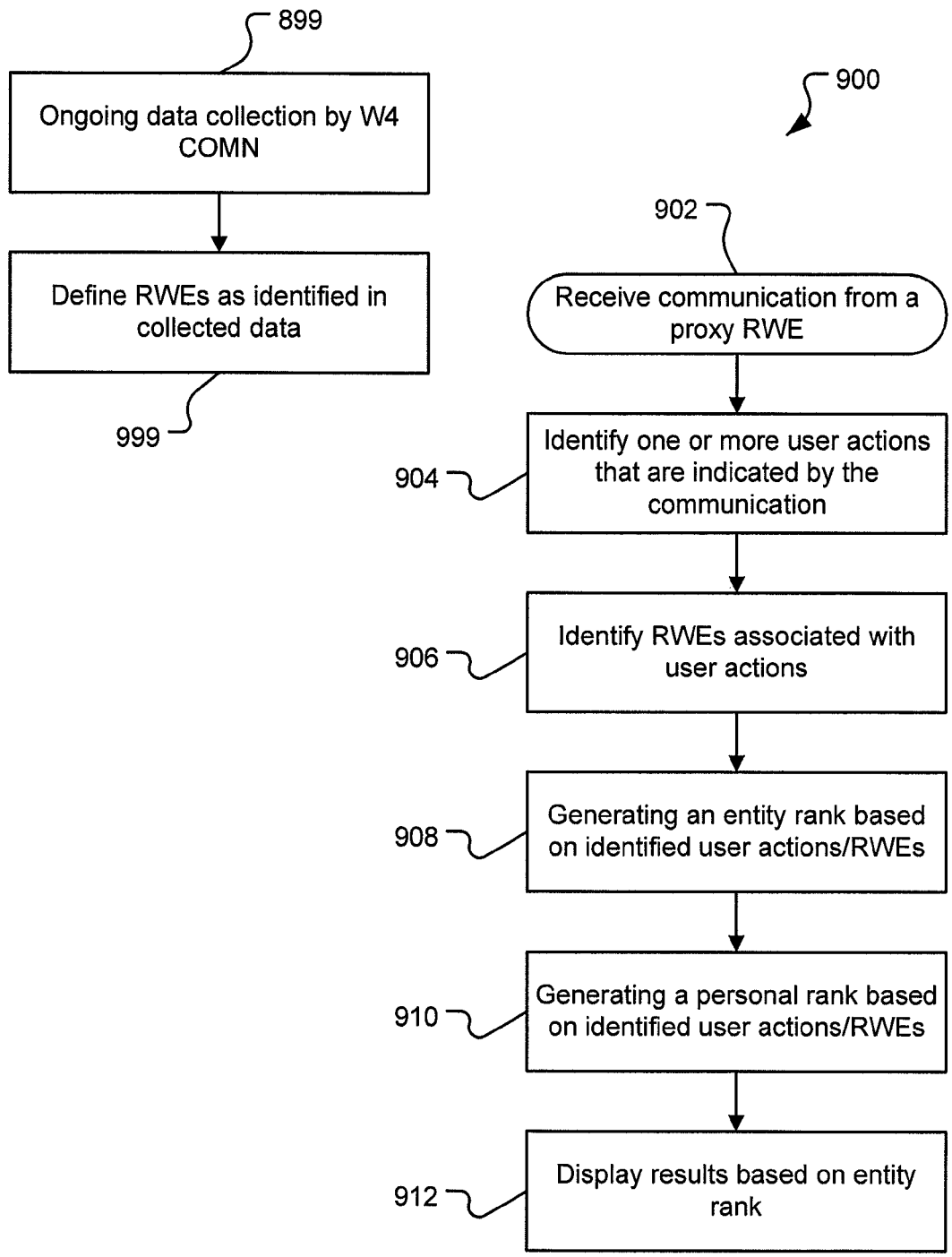
FIG. 9 illustrates an embodiment of a method for generating an entity rank for RWEs on a network based on user actions as determined from W4 data received from different communication channels.

FIG. 9 illustrates an embodiment of a method 900 for generating an entity rank for RWEs on a network based on user actions as determined by communications received from different communication channels. In the embodiment shown, data is collected as previously described with reference to FIG. 8 in an ongoing data collection operation.

As discussed above, the data may be collected from communications detected by the W4 COMN. In the embodiment, a communication (e.g., an electronic message or transmission between RWEs such as a message sent between by a first user via the first user's proxy device to a second user via the second user's proxy) may be considered to be detected when it is received from the sender(s). It is anticipated that under most circumstances that any attributable sender RWE (including any user and certainly any proxy device) will already be known to the W4 COMN and provided with a unique W4 identifier as well as at least one communication channel-specific address (which is another form of unique identifier). In cases of truly new RWEs, such as new telephone numbers, new devices that have never before been detected/used on the W4 COMN, a new RWE definition is created for that RWE and a new unique W4 identifier assigned to that RWE. The W4 COMN further will continually evaluate the W4 data looking for evidence of relationships so that, over time, new RWEs may be positively identified as proxies or otherwise associated with other RWEs.

The analysis of communications, identification of new RWEs by the W4 COMN and subsequent creation of new RWE definitions as a result of the identification is illustrated in the Method 900 by the entity definition operation 999. This operation 999 includes the initial assignment of a unique W4 identifier to the RWE as well as the ongoing task of identifying relationships between the RWE and other RWEs over time. For example, upon first use of a cell phone it may not be possible to determine who the cell phone is a proxy for. In such as situation, a new RWE may be defined for the cell phone (e.g., based on its telephone number or device identifier) and a new placeholder RWE may be defined for the as-yet-unknown user for whom the cell phone is a proxy. Subsequently, over time it may be possible to collect information from a plurality of different sources, surveillance video, cell phone location information, RFID transponder data, and credit card transactions to identify that the cell phone is a proxy device of a previously known user. In this case the placeholder RWE may be deleted and the cell phone associated with the previously known user.

Such ongoing revision of RWE definitions, then, can be considered to include creating an RWE definition for each newly identified RWE including for each new device that interacts directly with the W4 COMN by transmitting a communication over the network and for each perceived, known or inferred person, place, legal entity, event or definable real-world thing that is not directly capable of transmitting communications via the network. For any entity not directly capable of transmitting communications, the definition operation 999 includes identifying those entities' proxies on the network, for example what traffic sensor is a proxy for which section of highway, what cell phone is a proxy for which user, what home telephone is a proxy for which users and which location, and what credit card is a proxy for which user.

The definition operation 999 may generate an identifiable definition for each RWE or may simply create a set of data associations that collectively serve as the RWE definition. Any suitable way of collecting information and identifying it as an RWE definition may be used as long as the system can positively identify the RWE. In an embodiment, an RWE definition may include one or more parameters such as spatial coordinates or other location identifiers, temporal parameters such as defined one or more specified time periods, social parameters such a identified social relationships with other RWEs (e.g., friends, co-workers, team mates, neighbors, familial relationships, etc.), keywords such as identified activities that are of interest, and electronic entity identifiers. A definition may also include an identification of all proxies currently known for the RWE.

The method 900 describes additional operations involved in identifying the actions of users and, from that information, generating entity ranks for RWEs. After the initial RWEs have been defined and are known, subsequent communications can be analyzed to identify user actions that are indicated by the communications. In the embodiment of the method shown, the analysis begins when a communication is received in a receive communication operation 902. Such a communication may be generated by software on a computing device operated by a user, by an automated process or by a "dumb" device such as a cellular phone or a sensor. As discussed above, one or more RWEs may be identified as a sender of the message. Such identifications may be made from the data of the message, the source of the request or a combination of both. In addition, deductions may be made concerning a user that is the sender of the message based on W4 data for the known device or software senders of the message, as previously described.

A communication will further identify one or more recipients of the message. As discussed above, each recipient may be identified by a channel-specific identifier of a proxy RWE of the recipient. Thus, similar to the situation with senders, there may be multiple recipients associated with a message. For example, a recipient of an email may be identified as "bill.smith@yahoo.com", which is an email address for a electronic mail account. Using the W4 data, it may be determined that the user associated that email address has multiple proxies on the W4 COMN including for example the email account identified by "bill.smith@yahoo.com", a mobile telephone identified with a telephone number, a home telephone identified by a different telephone number, a toll payment transponder identified by a transponder identification number, a car identified by a license plate, an internet protocol (IP) address, a business telephone identified by a third telephone number, and a home address identified by one or more physical location coordinates or addresses. In an embodiment, requests to deliver a message to a recipient that is determined to be a proxy for a user (or other RWE such as a business or location) may be interpreted as requests to deliver the message to the user (or other RWE) that is accessible via the proxy as discussed below.

RWEs and IOs associated with a communication may be identified in the content or transmission information by any identifier, unique or non-unique, communication channel-specific or global, as long as the identifier can be resolved by the W4 COMN to a known RWE or IO, that is to a unique W4 identifier. Resolving channel-specific identifiers can be done by correlating the channel-specific identifier with other W4 data. Non-unique identifiers (e.g., email address identifiers such as "Mom", "father", "Debby", "Bob", "Starbucks") may have to be disambiguated based on the W4 data known about the sender and the message to be delivered and any suitable disambiguation method may be utilized for this purpose.

In an embodiment, a communication may be considered to be detected when it is received from the sender(s), although the reader will understand that the message may not have actually been sent at the time of receipt or detection by the W4 COMN. It is anticipated that under most circumstances that any attributable sender will already be known to the W4 COMN and provided with a unique W4 identifier as well as at least one communication channel-specific address (which is another form of unique identifier).

As mentioned above, the data collection may include receiving an actual IO (e.g., message file, audio data or snippet of text) from an RWE or from an IO such as an email application being executed by an RWE. The IO that is the communication may contain data such as the text or contents of the communication as well as additional information in the form of metadata. The data contained may be evaluated in order to identify the sender(s), recipient(s), additional RWEs associated with the message (e.g., people listed in text of a message but that are neither the sender nor a recipient), other IOs (e.g., hyperlinks to IOs, attachments, etc.) contained in the message, delivery conditions if any and any topics discussed in the message.

The receive communication operation 902 may be considered to occur at any point in the delivery chain within the W4 COMN, e.g., by any one of the engines used to conduct IO intake, routing or delivery. For example, depending on how the implementers of the W4 COMN choose to implement the network functions, a message may be received and initially analyzed and information routed to the correlation engine and addressing engine by any one of the message intake and generation manager, user profile manager, message delivery manager or any other engine or manager in the W4 COMN's communication delivery chain.

After receipt of the communication, the contents of the communication are analyzed and user action are identified in an action identification operation 904. The analysis performed in the action identification operation 904 may include searching the communications for data matching one or more predefined action types such as a purchase, a co-location for a significant period of time, co-location due to passing through to another destination, participation in an event, etc. Such action identification may be performed by searching the communication to identify keywords or data strings that are associated with different action definitions.

For example, data strings in a credit card transaction may be used to identify that a user made a purchase as well as to identify what was purchased, what RWE the purchase was made from, and how much was paid. All this data may be stored so that the credit card, the credit card's owner, the item purchased, the business from which the purchase was made and the location of the business are associated at the time of the purchase.

Events, that is a specified time period and location (that may, or may not, be associated with other RWEs as well, e.g., sports teams, plays, meetings, etc.), may also be tracked for attention purposes. In such cases, user actions that implicate attendance or other actions associated with an event (e.g., buying a ticket) may be identified. The event, if it is a defined IO or RWE known by the system, may then be associated with the user and the entity and personal ranks for the event modified to reflect this information/association.

The action identification operation 904 is optional and, in an alternative embodiment, such information may be derived from comparing RWE information between RWEs.

The method 900 also includes an RWE identification operation 906 in which RWEs associated with the communication are identified. The RWE identification operation 906 may include searching the communication for data matching one or more RWE definitions.

The RWE identification operation 906 includes determining whether the RWEs identified are proxies for other RWEs. In addition, if a specified RWE is not a proxy, the identification operation 906 further includes identifying any RWEs that may be used as proxies for the specified RWE.

For example, given the relationships described in FIG. 1, a sender of an IO may specify an email address for the user 102 as a recipient. By retrieving the W4 data for the email address, it can be determined that it is a proxy for the user 102 and that the user 102 has many other proxies that could be used to identify the location of the user 102 including the car 106 and cell phone 104. The identification operation 906 may further identify the IOs (e.g., IOs 122, 124, 126) from which the current location information may be obtained for each of the identified proxies for the current location of the user 102.

The identification of proxies, as discussed above, may be explicit (e.g., designated as proxies by their associated user or RWE) or implicitly determined based on an analysis of W4 data. As discussed above, such W4 data may have been collected from messages, communications and IOs previously obtained or handled by the W4 COMN via many different communication channels and systems, including email and text-based communication channels as well as any communication channels that include audio data including channels that support telephone, voice over internet protocol (VOIP), and video communications such as video chat.

To determine implicit proxies, the W4 data may be graphed in order to determine what RWEs are related and how and from this information make probabilistic assumptions about the nature of the relationships between RWEs. In an embodiment, correlations are made for and between each of the RWEs known to the W4 COMN based on the social data, spatial data, temporal data and logical data associated with each RWE. In one sense, the graphing operation may be considered a form of comparing the retrieved social data, spatial data, temporal data and logical data for all RWEs to identify relationships between RWEs and other contextual similarities.

It should be noted that the determination of implicit proxies may be performed each time a delivery condition is tested. This allows for the dynamic determination of the appropriate proxy for any RWE at any time. For example, during the week a corporate car or corporate cell phone may be considered a good proxy for the location of a recipient; but during the weekend a personal cell phone or personal car may be considered a better proxy for the recipient than the work cell phone.

After the user action(s) and RWEs have been identified as described above, an entity rank is generated for each RWE in an entity rank generation operation 908. In the entity rank generation operation 908, an entity rank is generated for each RWE based on the current W4 data. The generation operation 908 will revise any previously generated entity ranks based on the newly received information.

Generating an entity rank may involve simple or complex algorithms. For example, in an embodiment a simple summation of the number of communications received, by any communication channel, that reference a particular RWE may be used as the entity rank for that RWE. This embodiment will cause the entity rank to reflect users whose proxies are co-located with the RWE, users that made purchases at the RWE, and even users that discussed the RWE in communications with other users.

The correlation and comparison process of the entity rank generation operation 908 can determine relationships between parties, topics, locations, etc. in part though the W4 COMN's identification of each RWE by a unique identifier and storage of information about the past interactions by those RWEs. The actual values or other metrics obtained as entity ranks by the generation operation 908 may vary depending on the calculations performed and weighting factors used. Any suitable method or algorithm for generating a value from different relationships identified in the data may be used. For example, all ranks may be normalized to some scale or may be aggregated without normalization.

In an embodiment, the W4 data are processed and analyzed using data models that treat data not as abstract signals stored in databases, but rather as IOs that represent RWEs that actually exist, have existed, or will exist in real space, real time, and are real people, objects, places, times, and/or events. As such, the data model for W4 IOs that represent W4 RWEs (Where/When/Who/What) will model not only the signals recorded from the RWEs or about the RWEs, but also represent these RWEs and their interactions in ways that model the affordances and constraints of entities and activities in the physical world. A notable aspect is the modeling of data about RWEs as embodied and situated in real world contexts so that the computation of similarity, clustering, distance, and inference take into account the states and actions of RWEs in the real world and the contexts and patterns of these states and actions.

For example, for temporal data the computation of temporal distance and similarity in a W4 data model cannot merely treat time as a linear function. The temporal distance and similarity between two times is dependent not only on the absolute linear temporal delta between them (e.g., the number of hours between "Tuesday, November 20, 4:00 pm Pacific Time" and "Tuesday, November 20, 7:00 pm Pacific Time"), but even more so is dependent on the context and activities that condition the significance of these times in the physical world and the other W4 RWEs (people, places, objects, and events) etc.) associated with them. For example, in terms of distance and similarity, "Tuesday, November 20, 4:00 pm Pacific Time" and "Tuesday, November 27, 4:00 pm Pacific Time" may be modeled as closer together in a W4 temporal data model than "Tuesday, November 20, 4:00 pm Pacific Time" and "Tuesday, November 20, 7:00 pm Pacific Time" because of the weekly meeting that happens every Tuesday at work at 4:00 pm vs. the dinner at home with family that happens at 7 pm on Tuesdays. Contextual and periodic patterns in time may be important to the modeling of temporal data in a W4 data model.

Another temporal data modeling issue is to model the various periodic patterns of daily life such as day and night (and subperiods within them such as morning, noon, afternoon, evening, etc.) and the distinction between the workweek and the weekend. In addition, salient periods such as seasons of the year and salient events such as holidays also affect the modeling of temporal data to determine similarity and distance. Furthermore, the modeling of temporal data for IOs that represent RWEs should correlate temporal, spatial, and weather data to account for the physical condition of times at different points on the planet. Different latitudes have different amounts of daylight and even are opposite between the northern and southern hemispheres. Similar contextual and structural data modeling issues arise in modeling data from and about the RWEs for people, groups of people, objects, places, and events.

With appropriate data models for IOs that represent data from or about RWEs, a variety of machine learning techniques can be applied to analyze the W4 data. In an embodiment, W4 data may modeled as a "feature vector" in which the vector includes not only raw sensed data from or about W4 RWEs, but also higher order features that account for the contextual and periodic patterns of the states and action of W4 RWEs. Each of these features in the feature vector may have a numeric or symbolic value that can be compared for similarity to other numeric or symbolic values in a feature space. Each feature may also be modeled with an additional value from 0 to 1 (a certainty value) to represent the probability that the feature is true. By modeling W4 data about RWEs in ways that account for the affordances and constraints of their context and patterns in the physical world in features and higher order features with or without certainty values, this data (whether represented in feature vectors or by other data modeling techniques) can then be processed to determine similarity, difference, clustering, hierarchical and graph relationships, as well as inferential relationships among the features and feature vectors.

A wide variety of statistical and machine learning techniques can be applied to W4 data from simple histograms to Sparse Factor Analysis (SFA), Hidden Markov Models (HMMs), Support Vector Machines (SVMs), Bayesian Methods, etc. Such learning algorithms may be populated with data models that contain features and higher order features represent not just the "content" of the signals stored as IOs, e.g., the raw W4 data, but also model the contexts and patterns of the RWEs that exist, have existed, or will exist in the physical world from which these data have been captured.

Calculations or algorithms used in the entity rank generation operation 908 may be further modified by limiting the communications used to generate the entity rank to those communications received within a predefined window of time (e.g., within the last six months for example). Additional distinctions may be made based on the type of RWE for which a rank is being generated. For example, an entity rank for a recreational location or travel destination (e.g., a ski area, a park, a resort, a beach, etc.) may be generated using a different algorithm or weighting of user actions/references than that for a restaurant, a service provider (e.g., a plumber, car repair shop, airline, etc.), a product (e.g., a book, a car, a vacuum cleaner, a self-sealing tubeless mountain bike tire, a movie, a DVD, etc.), or a musical act (e.g., a musician, a band or a play).

The entity rank generation operation 908 may take into account the type of user actions, if they are known. For example, repeat purchases by the same user may be weighted more highly than the same number of purchases by different users. Additionally, merchandise returns or repairs may have a negative effect on the entity rank of the seller of the merchandise or the product being repaired. Time spent at a location may also be tracked as a specific user action and used as a surrogate measure of a user's opinion of the business, service or experience associated with the location.

In addition, negative and positive comments as determined from an inspection of the context of interpersonal communications may be used to negatively or positively adjust the entity rank. For example, the statement in an email, "My Chevy pickup is terrible—I need to get something that doesn't fall apart" may result in an entity rank for an RWE that represents Chevrolet trucks in general, as well as the RWE that represents the user's model and year of Chevrolet truck and the RWE the represents the actual truck the user drives, being reduced to reflect the user's negative opinion.

In the method 900 shown, a personal rank generation operation 910 is also provided that generates a personal rank for RWEs known to the system. In an embodiment, a personal rank may be generated for RWEs relative to a specified user or other RWE as discussed above. In such an operation 910, a determination may be made to identify the RWE and any related or proxy RWEs for which communications should be evaluated. For example, a personal rank of RWEs for a first user may take into account user actions and references in communications from the first user's social circle of friends and family. For business-related services, a personal rank may take into account the first user's co-workers preferences as indicated by prior communications. Once the set of the proxies to be used has been identified, the communications for those proxies are retrieved and analyzed independently to generate a rank of the all the RWEs in a manner similar to the entity rank generation operation 908. Thus, in an embodiment, generating a personal rank may be considered substantially the same process as generation of an entity rank, but only using a defined subset of communications from related RWEs rather than all communications from all RWEs.

In the embodiment shown, the flow chart illustrates that the entity rank and personal rank for each RWE are recalculated after receiving a new communication. In an alternative embodiment, the entity rank generation operation 908 and/or personal rank generation operation 910 may be performed periodically rather than being triggered by receipt of a communication. In yet another embodiment, the entity rank generation operation 908 and/or personal rank generation operation 910 may be performed on an as needed basis, such as when generating search results or other information for display to a user or use by another process on the W4 COMN, such as a recommendation service.

The entity ranks and personal ranks determined in method 900 may be used for any purpose in which it is useful to know the level of interest in different RWEs by other RWEs. In the embodiment of the method 900 illustrated in FIG. 9, the entity ranks and personal ranks are used in a display operation 912 in order to modify how information about the RWEs is presented to users. One example of such a display operation 912 is that described with reference to FIG. 8 in which web page search results are presented to a user based on the entity rank and personal rank of the RWEs associated with the web pages in the results. Other embodiments of display operation 912 include displaying a list of RWEs ordered based on entity rank and/personal rank or transmitting a list of RWEs selected based on entity rank and/personal rank to some executing process that uses the listed RWEs as a starting point from which to make automated decisions related to selection of pricing or advertising. For example, the price charged for advertisements associated with web pages for RWEs that have an increasing entity rank may be automatically increased based on the evidence of new popularity of the RWE.

Many other uses of entity ranks and personal ranks may are possible. For example, the entity ranks and personal ranks of related RWEs may be used to automatically generate up-to-date "best of" listings of RWEs. In a travel context, a prospective travel to a destination could use entity ranks and personal ranks to identify a ranked listing of locations, businesses and other RWEs of personal and general interest at the destination.

In an embodiment, entity ranks can be used to visually show information (e.g., popularity, speed of service, density of use, etc.) about physical entities via visual display. For instance, a user could request a display of the top ten pizzerias in Kazakhstan, and entity rank could be used to determine what the top ten pizzerias in Kazakhstan were. Each pizzeria could be represented by an icon and overlaid on a digital map such that a user could see the location of the top ten pizzerias in Kazakhstan. The size of the icons could indicate the popularity of the pizzerias. This is just one of the myriad ways that entity rank can be used to rank and display physical entities to a user.

Figure 10:
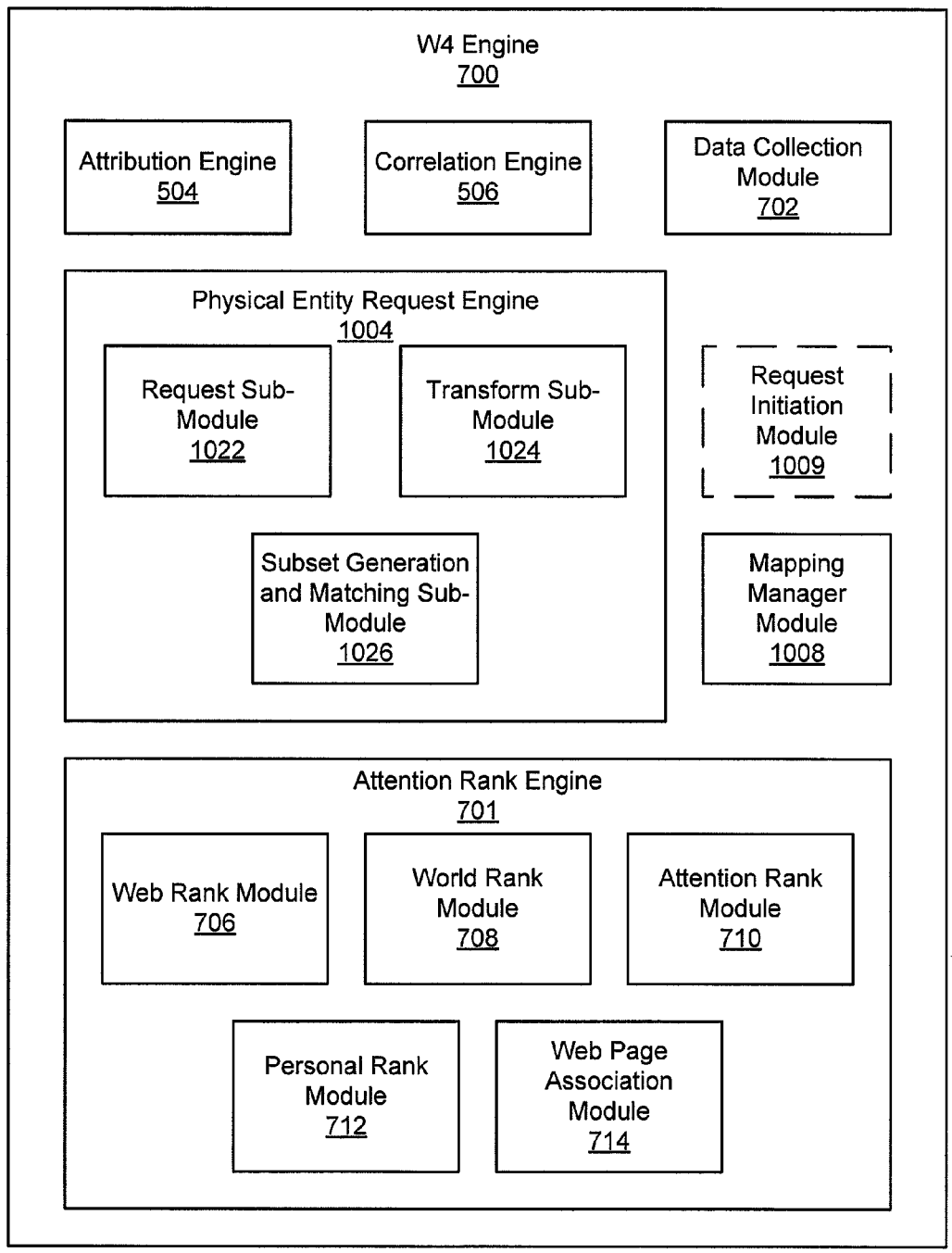
FIG. 10 illustrates a W4 engine for displaying one or more physical entities and indicating the attention rank for each physical entity.

FIG. 10 illustrates a W4 engine for displaying one or more physical entities and indicating the attention rank for each physical entity. In an embodiment, the W4 engine 700 has a physical entity request engine 1004, a request initiation module 1009, and a mapping manager module 1008.

The request initiation module 1009 can initiate a request to display information related to one or more physical entities. The request engine 1004 can determine, based on a user generated or automated request, which physical entities will be analyzed and ranked. The mapping manager module 1008 can visually present information related to the physical entities.

The request engine 1004 can receive a request to display information related to one or more physical entities via a request sub-module 1022. The request engine 1004 can transform the request into search data via a transform sub-module 1024. The request engine 1004 can also apply the search data to a set of predefined physical entities known to a network to derive a subset of physical entities matching the search data via a subset generation and matching sub-module 1026. The attention rank engine 701 can then rank the subset of physical entities.

A request to display information related to a physical entity is received by the request sub-module 1022 where a request can be a request for a listing of companies, service providers, or other entities that match certain criteria, e.g., "closest five star pizza", "best biking trails in Denver", "best bands playing tonight", and "best elk hunting in Colorado".

In an embodiment, software on a computing device operated by a user can request information related to one or more physical entities. For instance, a user may enter text into a web browser via a keyboard, touch screen, electronic stylus, voice command, or other means. For example, a user could request information via the following voice command: "What are the top ten pizzerias in Kazakhstan?"

In an embodiment, a computing device can display predetermined questions to the user where the questions can be generated via the W4 COMN's analysis of the user's current and past locations, actions, and/or relationship(s) to other physical entities. For instance, a user on the subway may be watching the news via his or her cell phone. The W4 COMN could recognize that the user is watching the news and is located on a Boston subway. Based on this data and the user's prior history of activities the W4 COMN may determine that the user is commuting home from work. As a result, hyperlinks could be displayed on the cell phone where the text of the hyperlinks represented predetermined requests such as "top Italian restaurant in Little Italy", "fastest sit-down restaurant in Boston", or "restaurants for the financially savvy of Cambridge".

The user could select one of these predetermined questions thus initiating a request to display information related to the one or more physical entities such as, but not limited to, the location of the restaurant, pricing, popularity, or average wait for a table.

In an embodiment, a request initiation module 1009 or other automated source can request information related to physical entities. Such sources can comprise computing devices, cell phones, smart phones, and internet-capable music/video players. For instance the W4 engine 700 may recognize that a user has entered his or her car at rush hour. As a result the request initiation module 1009 can request information regarding traffic on the freeway that the user most-commonly travels on.

Since requests are received in various formats, a transform sub-module 1024 can transform the request into search data (a data form that can be analyzed by the physical entity request engine 1004) using methods known in the art. For instance, a request in the form of text can be parsed (e.g., "top 10 pizzerias in Kazakhstan" can be transformed into search data comprising "top", "10", "pizzerias", "in", "Kazakhstan"). In another example, a voice request can be converted to text and parsed. In embodiments where predefined requests in the form of hyperlinked text are selected the transform sub-module 1024 can, as a result of the selection, create search data from or based on the text of the hyperlink. In the instance of an automatically-generated request, the transform sub-module 1024 can transform said auto request into a format recognizable by the physical entity request engine 1004.

Search data can be used by the subset generation and matching sub-module 1026 to determine the physical entities that a user expects to be displayed as a result of a request. This is done by applying the search data to a set of predefined physical entities known to a network in order to derive a subset of physical entities matching the search data. The set of predefined physical entities can be all physical entities with a W4 identifier. The subset comprises physical entities in the predefined set that the matching sub-module 1026 deems to be of interest to the user based on the request and W4 COMN data. For instance, given a request for "the top pizza places" the subset could include all restaurants selling pizza, all grocery stores selling pizza, all business specializing in pizza sales, or a combination of the above. The subset could also include all establishments specializing in pizza within five miles of the user. Various criteria for selecting physical entities to comprise the subset can be used.

In an embodiment, the subset generation and matching sub-module 1026 can analyze the search data along with W4 COMN data about the source of the request to determine the type of physical entities requested. Once the type is determined, the matching sub-module 1026 can use algorithms known in the art to match search data with physical entities from the predefined set of physical entities. In an embodiment, the W4 engine 700 can contain a database of predefined physical entities with data associated with and describing each entity. The matching sub-module 1026 can match search data with the data associated with and describing each predefined physical entity.

A number of criteria can be extracted from the search data and/or W4 COMN data and used to create a subset of physical entities from search data. Examples include, but are not limited to, the requested entity type, a time or time period, geographical region, and size of subset.

Requested entity type can often be determined by extracting nouns from a request. For instance, given the request, "stores that sell ties in Santa Monica", the nouns are "stores", "ties", and "Santa Monica". The location is easily recognizable by textual comparison to a database of common locations, leaving the two nouns "stores" and "ties". These are both common physical entities that would likely be found in a database of physical entities, and when found in the same sentence, as seen here, physical entities could be returned that are described by both "store" and "tie".

A time limitation found in the search data or inferred from W4 COMN data, such as prior request history, can be used to narrow the subset of physical entities. For instance, if the user requests a time of day, such as "dinner", then the subset generation and matching sub-module 1026 can limit the returned physical entities to those that are highly rated for dinner. Other search data terms that can initiate a time or time period limitation on results include, but are not limited to, "between", "when", "now", "soon", "tomorrow", and "this week" for example. In some instances, the matching sub-module 1026 can infer a time limitation. For instance a request calling for a display of traffic on a particular freeway (e.g., "traffic on the 405") does not explicitly request a time period. However, based on the user's history or the user's location and movement, headed towards the 405, it can be inferred that the user is likely interested in rush hour traffic at the current moment.

A location limitation found in the search data or inferred from W4 COMN data, such as prior location history, can be used to narrow the subset of physical entities. For instance, if a request uses terms such as "where" or "location of", then an explicit geographic region can be used to limit the number of physical entities in the subset. For instance, a user may request the following: "Where do rich attorneys eat dinner?" resulting in a subset of physical entities limited to the business establishments where "rich attorneys eat dinner". Alternatively one or more locations can be inferred from a request where a location has not been explicitly provided. For example, the request "What bars do single people frequent?" lacks a term commonly associated with locations, and yet the matching sub-module 1026 could infer that a geographic limit to the request was intended.

In an embodiment, the size of the subset can be limited explicitly by user request or inference. For example, if a user requests "the top 10 businesses in City X" then the subset can comprise ten physical entities. If a user requests "food-vendors" the matching sub-module 1026 can infer that only local food vendors are desired and thus limit the subset to food-vendors within a given radius from the user.

In another embodiment, the size of the subset can be limited by a default value unless a user specified limit overrides the default. For instance, the matching sub-module 1026 can limit the size of the subset to one thousand physical entities or some other fixed value. Alternatively, the matching sub-module 1026 can limit the size of the subset based on an algorithm that determines a subset size limit based on the type of request and type of data to be displayed. In another embodiment, the subset can include all matching physical entities and allow other modules or engines to limit the number of physical entities that are displayed.

Inferences can be made via a combination of search data analysis as well as analysis of W4 COMN data. For instance, a user may frequent Asian cuisine more often than Mexican cuisine. Said user may request the best restaurants in town, but not specify the type. The matching sub-module 1026 can note the lack of a specified restaurant type and use knowledge of the user's tendencies to limit the restaurants in the subset to those of Asian orientation and only the most popular Mexican restaurants. Alternatively, the sub-module 1026 can only include Asian restaurants in the subset. In another example, a first user living in Boston and requesting "best burritos" may receive a display of the best burrito restaurants in Boston, while a second user in Houston and requesting "best burritos" may receive a display of the best burrito-selling grocery stores in Houston.

In an embodiment, attention distance can be used to find physical entities that are similar to those in an initially-determined subset. For instance, if the matching sub-module 1026 finds a physical entity described by the text "Bonzo's Pizzeria" and no other pizzerias in the city have terms related to "pizza" in their names, then attention distance can be used to find other pizzerias similar to Bonzo's.

In another embodiment, physical entities can be indexed similar to the way that web pages are indexed by a web crawler or web spider. Software could access information related to physical entities, or their proxies on the W4

COMN and provide data related to the physical entity to a physical entity database. The matching sub-module 1026 could scan the physical entity database trying to find data related to physical entities similar to the search data of the request.

Once a subset of physical entities has been generated, physical entities can be ranked via the attention rank engine 701. The entity rank may be a relative rank or may be an absolute rank, depending on how operators of the system choose to implement the world rank module 708. Such an entity rank may be determined based on analysis of all the data available at the time that entity rank is needed so that the rank reflects the most recent actions of physical entities as well as their past actions.

The attention rank engine 701 can generate an entity rank either on a periodic basis or in response to actions taken by the physical entity query engine 1004. Entity rank is generated based on available W4 data. In an embodiment, current W4 data can be obtained in response to a request for an entity rank so that entity rank is not based on old data.

The attention rank engine 701 can generate personal rank that can be generated prior to the matching sub-module taking action or after the subset has been created. Similar to entity rank, personal rank can be retrieved when needed or can be generated dynamically on an as needed basis, which has the benefit of using the most up-to-date information.

In an embodiment, a combined rank based on the web rank, entity rank and personal rank can be created. In an embodiment, a combined rank based on the web rank and entity rank, web rank and personal rank, or entity rank and personal rank can be created. As discussed above, each rank can be weighted differently in order to skew the combined rank.

In an embodiment, entity rank can be limited to ranking based on certain users or physical entities as dictated by the user. Such a rank can be referred to as group rank. For instance, a user may request the following: "What are my friends' favorite bookstores?" In this example, instead of ranking physical entities based on a large sampling of W4 COMN data, only the user's friends' attention to bookstores would be used to determine entity rank. Group rank can be performed in addition to or in place of personal rank. Examples of other sets of physical entities that can be used to rank physical entities in such a manner include, but are not limited to, co-workers, classmates, family, professors, and clients. In an embodiment the user can create predefined groups of users or physical entities that can be selected for a request. For instance, a user may predefine a group as "the curling team" and thereafter use this group reference to request displays of information related to physical entities as ranked by the users defined as belonging to "the curling team".

Alternatively, the attention rank engine 701 can receive notification from the W4 engine 700 that the user is in the presence of members of "the curling team" and thus calculate group rank based on this group rather than calculate entity rank. As such, the user could automatically receive displays ranked via the group that the user is in the presence of (assuming the group is predefined or recognized by the W4 engine 700).

Depending on the embodiment, the entity rank for each physical entity may be determined prior to receiving the search request (e.g., the entity rank is periodically or occasionally generated based on the W4 data available at that time) or may be generated dynamically in response to subset generation. As discussed above, the entity rank is derived from W4 data which, is obtained from various sources.

Once a subset has been created, and the physical entities in the subset have been ranked (either operation occurring first), a mapping manager module 1008 can present information regarding the one or more physical entities in the subset to a first user. The mapping manager module 1008 can be comprised in the W4 engine 700 as a separate module from the physical entity request engine 1004. The mapping manager module 1008 takes the subset of physical entities produced by the physical entity request engine 1004 and determines what information related to the one or more physical entities in the subset should be presented to a first user and how that information should be presented to a first user.

In an embodiment, the mapping manager module 1008 can have predefined display methods for certain types of inquiries. For instance, requests for the most popular physical entities can display as icons or dots overlaid on a map. Users can then manually select other display formats such as contour maps, for example. Users can also request specific display types. For instance, a request such as "most popular Italian restaurant contour map" could display a contour map overlaid on a map rather than the default icons overlaid on a map.

In an embodiment, the user can be prompted to select a display method. For instance, requests could be entered via a text box and in place of a "search" button to initiate the request, there could be buttons each representing different display formats (each button could take the shape or an image representative of the display format). When one of these button is selected, the search could be initiated and displayed using the display method corresponding to the selected button.

It should be understood that icons and contour maps are not limiting examples of display types. Rather any visual or visual combined with audible and/or tactile representations of physical entities are also envisioned.

There are myriad ways to display information related to physical entities (e.g., icons overlaid on a map, contours overlaid on a map, a listing, and/or histograms). In an embodiment, multiple forms of display can be overlaid. For instance, icons could be overlaid on a map while a histogram displayed the quality or value of each icon (e.g., popularity, speed of service, etc.). Such displays can be dynamic and/or static. For instance, a display of restaurants with the fastest service could be displayed as a set of dynamically changing display objects (e.g., dots, squares, restaurant icons, etc.) overlaid on a map. Each display object could represent a restaurant and the changing colors could indicate the speed of service at different times in the day, or on different days of the week (for example color changes on a TV weather map over time). The time of day could be displayed via text, a graphic of a clock synced with the changing colors of the display objects, or any other visual display of time.

Displays can be in color, black and white, grey scale, or any combination of the above. The mapping manager module 1008 can overly the display of a plurality of subsets of physical entities simultaneously.

Selecting representations of physical entities (e.g., icons, contours, bars in a histogram), can change the subset of physical entities displayed. For instance, selecting a contour on a contour map of popular restaurants could cause the mapping manager module 1008 to display only those restaurants equal to or more popular than the restaurants in the selected contour. In an embodiment, a user can use a selection box or other shape to select multiple physical entities of interest and initiate either isolation of those physical entities in the display or initiate display of more detailed information regarding the selected entities.

A variety of display types are envisioned including, but not limited to, icons, symbols, contour maps, and histograms. In one embodiment, the user can select the display type (see description of interactive displays below). In another embodiment, the mapping manager module 1008 selects the display type based on the request along with an analysis of W4 COMN data such as the user's location when the request is made.

In an embodiment, a user may request information that concerns more physical entities than can be usefully displayed. In such instances, the mapping manager module 1008 can limit the number of physical entities displayed. For instance, if a user requested "busiest part of Washington D.C.", the mapping manager module 1008 could present a map of Washington D.C. with dots indicating the locations of cell phone users at that moment. However, since there could be more cell phone users than could be practically displayed the mapping manager module 1008 could present the cell phone users in a contour map instead of using dots to indicate individual users. Such a contour map could be transparent allowing the underlying map to be seen through the contour map which would be color-coded to indicate the density of users at any point on the map. The contour map method allows a large number of physical entities to be displayed without cluttering the display with dots or icons. This is just one example of the mapping manager module 1008 determining a best means for displaying a request.

Although the matching sub-module can sometimes find accurate matches between physical entities and the requests for the entities, sometimes accurate matches will not exist and physical entities will be displayed that may not be of interest to the user. As a result, the matching sub-module 1026 can have the ability to rate the accuracy of matches. The mapping manager module 1008 can indicate the degree of matching via a textual or graphical indication. For instance, given a request for the top ten pizzerias in Kazakhstan, the matching sub-module may only be able to create a subset comprising the top ten pizzerias in Asia since there may not be ten pizzerias known to the W4 COMN in Kazakhstan. The resulting display could present a percentage representative of the degree to which the subset matches the user's request (which is an estimation produced by either the matching sub-module 1026 or the mapping manager module 1008).

Another example of a possible instance where the matching sub-module 1026 can fail to capture the essence of a user request is when a user uses uncommon or slang terms in a request. For instance, "joint" may be used to indicate that the user desires information related to a place of business. The matching sub-module 1026 can have a database of recognized terms and can be updated as the meaning of terms changes or as new terms are added to common vernacular. Yet, some terms will retain a lack of agreed upon meaning or not exist in the database. In such instances the matching sub-module 1026 can replace the indefinite or unrecognized terms in the search data with definite and recognized terms. In doing so it is possible that the user's intent will not be captured. As a result, the mapping manager module 1008 can indicate that an approximation of the user request was made or indicate the specific terms and/or meaning that was used in place of the user request.

For instance, a request may use the term pizza joint and the transform sub-module 1024 can determine that joint, in the context of the request, is likely equivalent to "places of business". The matching sub-module could then replace "joint" with the search data terms "places of business". The mapping manager module 1008 can display the text "pizza place of business" to indicate to the user that replacement search data terms were used. As such, the user can see whether or not the matching sub-module 1026 understood the request, and initiate a different request if he/she is not satisfied. Other forms of alerting the user that replacement search data was used are also possible.

In an embodiment, the mapping manager module 1008 can present interactive displays. For instance, the mapping manager module 1008 can display a list of predefined requests related to the user's request wherein the elements of the list can be selected as search data for new requests. For instance given a request for "pizza joints in NYC" a list including the following predefined requests could be presented: "pizza joints in Brooklyn", "pizza joints in Manhattan", "pizza joints in Bronx".

In another example, a user may request a display of businesses in New England. Such a display, if presented with dots indicating the locations of every business in New England, could be so cluttered that the map would not be visible. As such the mapping manager module 1008 could instead present dots only indicating those businesses with greater than a certain number of employees, a certain number of business locations, a certain revenue threshold, and/or other thresholds. The user could then zoom in on any part of the display, such as New York City, and the display could increase the number of businesses displayed since while zoomed, the display would not be overwhelmed by the increased number of businesses displayed. This example shows that the mapping manager module 1008 can display some of the physical entities in the subset of physical entities or all physical entities in the subset. In certain instances, a user can make a broad request, again for businesses in New England, and yet zoom in on a portion of New England in which there are no businesses to present. Thus, the mapping manager module 1008 can also display none of the physical entities in the subset of physical entities.

The mapping manager module 1008 can also provide controls allowing users to change the method or character of physical entity display. For instance zoom buttons can be provided. The mapping manager module 1008 can also provide controls allowing users to change the time period through which physical entities are displayed. For instance, a user may use display controls to indicate that a dynamically looping display of traffic on Los Angeles' 405 freeway should only display traffic between 4 p.m. and 6 p.m. rather than for the entire day (which could have been the default display setting). Users can also select the rate of change in a dynamic display. The traffic display can loop by default every five seconds, but a user can select a two second or ten second loop, for example.

The mapping manager module 1008 can also provide selection objects allowing the user to indicate to the W4 engine 700 how well the request engine 1004 matched the user's request. For instance, if a user requested pizzerias in Kazakhstan, but a display of pizzerias in all of Asia was presented, then the user could select a selection object that indicated to the W4 engine that the user's request was not well met. In response the physical entity request engine 1004 could select a new subset of physical entities and rank them; the matching sub-module 1026 using an alternative matching algorithm or using different replacement terms (if applicable) to select a subset more in line with the user's request.

In an embodiment, the mapping manager module 1008 allows users to interact with the display via mouse-overs (where a user moves a mouse indicator over objects on the display without selecting those objects). In an embodiment, information related to a physical entity can be displayed when the user moves the mouse indicator over a physical entity's representation on the display. For example, the name and the entity rank of a physical entity that is moused-over can be displayed. In another example, if the searching user can be identified from the request, then a link to reviews of the physical entities by people in the searcher's social network or by reviewers known to be consulted by the searcher in the past may be provided. Mouse-overs can reveal details of commercial incentives such as coupons for a physical entity. Additionally, a short description, advertisement, image, or video could be presented in response to a mouse-over.

Commercial incentives can be displayed such that preference is indicated for those incentives with the largest savings or greatest value to the user. Such a display could be personalized via user interaction with the display or via a user profile stored in the W4 engine 700.

A display can include hyperlinks associated with locations on a map, physical entities on a map, the text in a listing, different levels in a contour map, or any other display feature representing physical entities. Hyperlinks can link to web pages associated with physical entities. For instance, selecting a contour in a contour map of restaurant popularity could take the user to a listing of web pages for the restaurants displayed in the selected contour. In another example, selecting an icon representing a certain restaurant can take the user to that restaurant's website.

Figure 11:
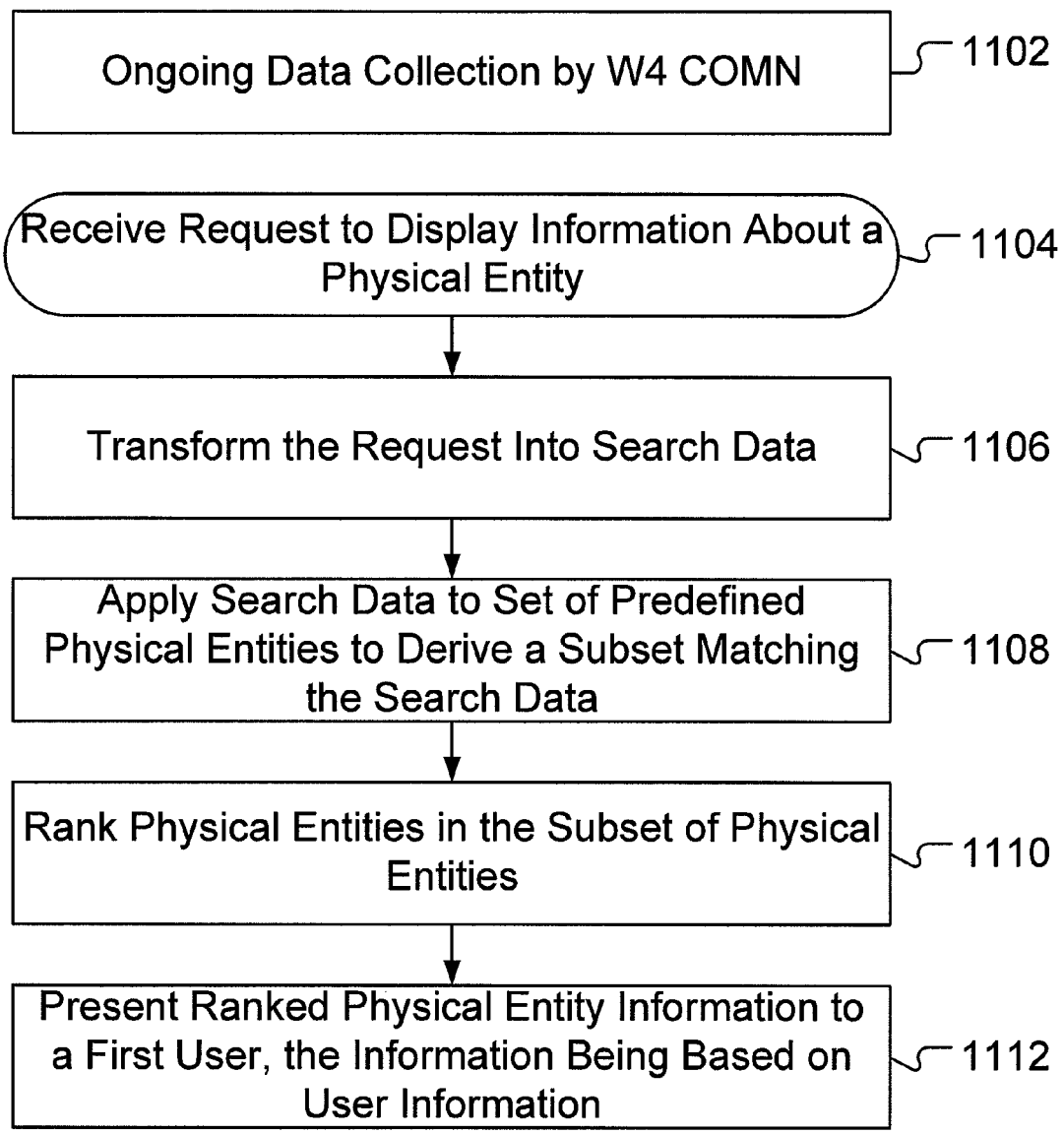
FIG. 11 illustrates a method for displaying one or more physical entities and indicating the attention rank for each physical entity.

FIG. 11 illustrates a method for displaying one or more physical entities and indicating the attention rank for each physical entity. As described with reference to FIG. 8, a foundational aspect of the W4 COMN that allows for conditional message delivery is the ongoing collection and maintenance of W4 data from the physical entities interacting with the network. In an embodiment, this collection and maintenance is an independent operation 1002 and thus current W4 social, temporal, spatial and topical data are always available for use in testing of delivery conditions. In addition, part of the data collection operation 1002 includes the determination of ownership and the association of different physical entities with different IOs as described above including prioritization among specific groups or sub-groups of physical entities and IOs. Therefore, each IO is owned/ controlled by at least one physical entity with a known, unique identifier on the W4 COMN, and each IO may have many associations with other physical entities that are known to the W4 COMN.

A request to display information related to a physical entity can be received in the receive request operation 1104. As noted above, a request can be a request for a listing of companies, service providers, or other entities that match certain criteria. In an embodiment, software on a computing device operated by a user can request information related to one or more physical entities. For instance, a user may enter text into a web browser via a keyboard, touch screen, electronic stylus, voice command, or other means.

In an embodiment, a user can select predetermined request thus initiating a request that can be received in the receive request operation 1104. Predetermined requests can be presented as text on a visual display and selected via mouse selection, touch screen, voice command, or other selection means. Predetermined request can also be presented via audible means.

In embodiment, the request is generated by an automated source, such as a cell phone, blackberry, or other computing device. Automated sources can generate a request in response to certain conditions recognized by the W4 COMN. For instance, use of a credit card or entry into a place of business can initiate generation of a request.

Since requests are received in various formats they can be transformed into search data in a transform the request into search data operation 1106. The transform operation 1106 can use methods known in the art for converting data into a form readable by a computing device. For instance, a request in the form of text can be parsed (e.g., "top 10 pizzerias in Kazakhstan" can be transformed into search data comprising "top", "10", "pizzerias", "in", "Kazakhstan"). In another example, a voice request can be converted to text and parsed. In embodiments where predefined requests in the form of hyperlinked text are selected, the transform operation 1106 can generate search data from or based on the text of the hyperlink. In the instance of an automatically-generated request, the transform operation 1106 can transform said auto request into a format recognizable by a computing device.

The search data created by the transform operation 1106 can be applied to a set of predefined physical entities known to a network in order to derive a subset of physical entities matching the search data. This can be performed in the matching operation 1108. The set of predefined physical entities can comprise all physical entities with a W4 identifier. In an embodiment, search data along with W4 COMN data can be analyzed to determine what physical entities best match the request. Algorithms known in the art can be used to match search data with physical entities from the predefined set of physical entities.

Various criteria and methods for matching search data to physical entities can be used. If physical entities in the predefined set of physical entities are preassociated with text that describes the physical entity, then said algorithms can match search data with physical entities via their textual descriptions. In an embodiment, a geographic limit to the subset can be applied where the geographic limit can be derived from the location of the physical entity. The matching operation 1108 can also use a user's current activity, prior history, or other factors to match search data with physical entities. In an embodiment, the user limits the number of physical entities in the subset by explicit numerical request. Alternatively, the size of the subset can be automatically limited based on the request and/or based on the matching physical entities.

Once a subset of physical entities has been generated, the subset can be ranked and presented to a user via a presentation and ranking operation 1110. The entity rank may be a relative rank or may be an absolute rank, depending on how operators of the system choose to derive world rank. Such an entity rank may be determined based on analysis of all the data available at the time that entity rank is needed so that the rank reflects the most recent actions of physical entities as well as the past actions. Depending on the embodiment, the entity rank for each physical entity may be determined prior to receiving the search request (e.g., the entity rank is periodically or occasionally generated based on the W4 data available at that time) or may be generated dynamically in response to receipt of a request. As discussed above, the entity rank is derived from W4 data which, is obtained from various sources.

The presentation and ranking operation 1110 also presents information related to the ranked subset of physical entities. This involves determining what information related to the one or more physical entities in the subset should be presented to a first user and how that information should be presented to the first user.

In an embodiment, the presentation and ranking operation 1110 utilizes predefined display methods associated with certain types of inquiries. In an embodiment, the presentation and ranking operation 1110 uses a display method selected by the first user. In an embodiment, the presentation and ranking operation 1110 utilizes predefined display methods, yet these methods can be preempted if a user requests a certain display method via manual selection or via the text used in the request.

As discussed above, there are myriad ways to display information related to physical entities, and those ways are equally applicable here.

Selecting representations of physical entities (e.g., icons, contours, bars in a histogram), can change the subset of physical entities displayed, as discussed above.

In an embodiment, the presentation and ranking operation 1110 can continue to operate while a user interacts with the display. For instance, the presentation and ranking operation 1110 can zoom in or out on a map overlaid with physical entities. In doing so, the operation 1110 can change the number of physical entities displayed. Essentially, the presentation and ranking method 1110 can determine a best means for displaying the ranked physical entities produced in response to a user request. Yet, the presentation and ranking operation 1110 can also respond to user interaction in order to alter the presentation of information related to the ranked subset of physical entities. This can include such things as zoom controls, mouse-overs, and hyperlinks, to name a few examples. The presentation and ranking operation 1110 can present information related to the ranked subset of physical entities for multiple requests at the same time. The operation 1110 can also present commercial incentives along with information related to one or more ranked subsets of physical entities. Presentation of the information above-described can be controlled either by the user, software running on a computing system or a combination of the two.

FIG. 12 illustrates an embodiment of a visibly depicted graphical user interface for displaying information related to a ranked subset of physical entities as described herein. The user interface, by way of non-limiting example, comprises a visible representation of a geographic region. For instance, in the illustrated embodiment, an overhead map of San Francisco is the geographic region that is visibly represented. Although a single rectangular-shaped geographic region is illustrated, other regions or a plurality of geographic regions can be singly or simultaneously presented with each region taking up the same or different amounts of space on the display.

In the example the visible representation comprises visible indicators representing physical entities. These visible indicators can have a variable characteristic dependent upon the on the attention rank of the represented physical entities. For instance, in the illustrated embodiment, textual indicators represent physical entities in San Francisco. In Fig. A the size of each textual indicator varies based on the web rank of the represented physical entities (e.g., Opera Co. 1202 has a higher web rank than SF Giants 1204). Similarly, in Fig. B the size of each textual indicator varies based on the world rank of the represented physical entities, and in Fig. C the size of each textual indicator varies based on the attention rank of the represented physical entities. GG Park for instance has either no web rank or one that is so small that it is not depicted, and a mid-level world rank 1206. As such, the attention rank 1208 is small compared to the attention rank of physical entities that had higher ranks in both web rank and world rank (e.g., SF Giants 1210, SF Zoo 1212, Alcatraz 1214). Although the illustrated embodiment derives attention rank from both web rank and world rank, in other embodiments attention rank can derive from either web rank or world rank alone or in a weighted combination of the two.

Although textual indicators are illustrated in FIG. 12 it should be understood that other indicators are also envisioned. For instance, indicators can be photos, graphics, or icons representative of physical entities, or items on a map can be differently colored, or items can be represented in the form of heat maps or histograms or topographic sections or overlays or isometric views or axononometric views, or other visual mapping schema. Indicators can be static or dynamic.

Although the variable characteristic of the visible indicators in the illustrated embodiment is the size of the indicators, other variable characteristics are also envisioned. For instance, if a dynamic indicator is used, then the speed with which the indicator performs its dynamic action can vary depending on the represented physical entity's attention rank. Color or audio characteristics can indicate the attention rank of the physical entity that an indicator represents.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. For example, a user can select to receive results of a request as either a ranked web page listing or a display of one or more subsets of ranked physical entities. Numerous other changes may be made that will readily suggest themselves to those skilled in the art and which are encompassed in the spirit of the invention disclosed and as defined in the appended claims.

The invention claimed is:

1. A method comprising:
receiving, at a computing device, a request to display information related to a first physical entity;
transforming, via the computing device, the request into search data;
dynamically applying, via the computing device, the search data to descriptive information related to a set of other physical entities known to a network, said application of the search data comprising deriving a subset of other physical entities matching the search data from the descriptive information related to the set of other known physical entities, the descriptive information corresponding to the other physical entities is analyzed as part of said deriving the subset of other physical entities that match the search data;
ranking, via the computing device, the physical entities in the subset of other physical entities to form a ranked subset of physical entities, the ranked subset based upon the applied search data, the ranked subset comprising the descriptive information corresponding to the other physical entities of the subset; and
presenting, via the computing device over the network, information related to the ranked subset of physical entities to a first user associated with a user computing device, the presenting of the ranked physical entities information being dependent upon user information stored in the network, the user information comprising data generated by the user, data associated with the user, and data associated with the request.

2. The method of claim 1 wherein:
the first user can interact with the ranked physical entities information to access further ranked physical entities information.

3. The method of claim 1 wherein:
the first user is presented with information related to commercial incentives; and
the presenting of the commercial incentives information being dependent upon user information stored in the network, the user information comprising data generated by the user, data associated with the user, and data associated with the request,
wherein the first user can interact with the commercial incentives information.

4. The method of claim 1 wherein the presenting of the ranked physical entities information is dependent upon data associated with the user's location.

5. The method of claim 1 wherein the presenting of the ranked physical entities information is dependent upon data associated with at least one of the time of the request, and the user's present and past activities.

6. The method of claim 1 further comprising:
analyzing communications from entity proxies for references to physical entities in the set of other physical entities; and
generating an entity rank for each physical entity in the set of other physical entities based on the references contained in the communications from the entity proxies.

7. The method of claim 1 further comprising:
collecting data indicative of user actions from a plurality of user proxy devices; and
generating an entity rank for each physical entity of the subset of physical entities based on data from the user proxy devices.

8. The method of claim 7 further comprising:
identifying, based on the data, a plurality of user actions;
for each user action, identifying a user and at least one physical entity associated with the user action; and
generating the entity rank for each physical entity in the subset of physical entities based on a number of user actions associated with each physical entity.

9. The method of claim 7 further comprising:
collecting the data from messages transmitted between two user proxy devices.

10. The method of claim 7 further comprising:
identifying a first user action, the data corresponding to the first user action including an identification of a first location;
determining that the first location is the first physical entity; and
associating the first user action with the first physical entity.

11. The method of claim 7 further comprising:
identifying a second user action, the data corresponding to the second user action including an identification of an event defined by a second location and a time;
determining that the event is a second physical entity; and
associating the first user action with the second physical entity.

12. The method of claim 7 further comprising:
identifying a third user action, the data corresponding to the third user action including an identification of a business;
determining that the business is a third physical entity; and
associating the third user action with the third physical entity.

13. The method of claim 1 wherein the request comprises:
data provided by at least one of the first user, and an autonomous source.

14. A system comprising:
a plurality of processors;
a physical entity request engine implemented by at least one of said plurality of processors comprising:
a request sub-module that receives one or more requests to display information related to first a physical entity;
a transform sub-module that transforms the request into search data;
a subset generation and matching sub-module that dynamically applies the search data to descriptive information related to a set of other physical entities known to a network, said application comprising deriving a subset of other physical entities matching the search data from the descriptive information related to the set of other known physical entities, the descriptive information corresponding to the other physical entities is analyzed as part of said deriving the subset of other physical entities that match the search data; and
an attention rank engine for ranking the subset of other physical entities to form a ranked subset of physical entities after having generated entity rank, attention rank, and personal rank, the ranked subset based upon the applied search data, the ranked subset comprising the descriptive information corresponding to the other physical entities of the subset; and
a mapping manager module implemented by at least one of said plurality of processors for presenting information related to the ranked subset of physical entities to a first user, the presenting of the ranked physical entities information being dependent upon user information stored in the network, the user information comprising data generated by the user, data associated with the user, and data associated with the request.

15. The system of claim 14 further comprising:
a web rank module that collects web data produced by user interactions with web pages;
a world rank module that generates an entity rank for each physical entity in the set of other physical entities; and
a request initiation module that initiates a request to display information related to the one or more physical entities.

16. The system of claim 14 further comprising:
an entity data collection module connected to the world rank module that collects user data from communications transmitted by the physical entities including identities of users associated with the communications, a number of communications and communication channels associated with the communications; and
wherein the world rank module generates the entity rank by mapping the user data.

17. The system of claim 14 further comprising:
a web page association module connected to the attention rank module that, based on the content of a web page, identifies at least one physical entity as associated with the web page; and
wherein the attention rank module when generating an attention rank for one or more of a set of web pages receives from the web page association module an identification of the at least one physical entity, if any, associated with each of the set of web pages.

18. The system of claim 14 further comprising:
a personal rank module that generates, for the first physical entity, a personal rank for each of the set of physical entities relative to the first physical entity; and
wherein the attention rank module, in response to a request associated with the first physical entity, generates the attention rank for the first physical entity based on the entity rank of physical entities associated with the first physical entity, and the personal rank of the physical entities associated with the first physical entity.

19. The system of claim 14, wherein each physical entity is one of a user, a user proxy device, a location, a legal entity, or a physical object.

20. A non-transitory computer-readable storage medium tangibly encoded with computer-readable instructions, that when executed by a processor associated with a computing device, perform a method comprising:
receiving a request to display information related to first a physical entity;
transforming the request into search data;
dynamically applying the search data to descriptive information related to a set of other physical entities known to a network, said application of the search data comprising deriving a subset of other physical entities matching the search data from the descriptive information related to the set of other known physical entities, the descriptive information corresponding to the other physical entities is analyzed as part of said deriving the subset of other physical entities that match the search data;
ranking the physical entities in the subset of other physical entities to form a ranked subset of physical entities, the ranked subset comprising the applied search data, the ranked subset comprising the descriptive information corresponding to the other physical entities; and
presenting information related to the ranked subset of physical entities to a first user, the presenting of the ranked physical entities information being dependent upon user information stored in the network, the user information comprising data generated by the user, data associated with the user, and data associated with the request.

21. The method of claim 1, wherein the ranked subset of physical entities includes the first physical entity.

\* \* \* \* \*